(12) United States Patent
Bradlow et al.

(10) Patent No.: US 12,018,953 B2
(45) Date of Patent: Jun. 25, 2024

(54) DETECTING TYPES OF TRAVEL CORRIDORS ON WHICH PERSONAL MOBILITY VEHICLES TRAVEL

(71) Applicant: Neutron Holdings, Inc., San Francisco, CA (US)

(72) Inventors: Henry Weston Bradlow, Stanford, CA (US); Punit Nitin Shah, San Francisco, CA (US); Wubai Zhou, Mountain View, CA (US); Jinsong Tan, Fremont, CA (US); Emad El-Haraty, Emeryville, CA (US); Li Jiang, Cupertino, CA (US)

(73) Assignee: Neutron Holdings, Inc., San Francisco, CA (US)

( * ) Notice: Subject to any disclaimer, the term of this patent is extended or adjusted under 35 U.S.C. 154(b) by 1253 days.

(21) Appl. No.: 16/659,448

(22) Filed: Oct. 21, 2019

(65) Prior Publication Data

US 2020/0124430 A1    Apr. 23, 2020

Related U.S. Application Data

(60) Provisional application No. 62/870,530, filed on Jul. 3, 2019, provisional application No. 62/748,197, filed on Oct. 19, 2018.

(51) Int. Cl.
*G01C 21/00* (2006.01)
*B62J 99/00* (2020.01)
(Continued)

(52) U.S. Cl.
CPC .......... *G01C 21/3461* (2013.01); *B62J 99/00* (2013.01); *B62K 11/007* (2016.11);
(Continued)

(58) Field of Classification Search
CPC ............ G01C 21/3461; G01C 21/3602; G01C 21/3658; B62K 11/007; B62K 15/006;
(Continued)

(56) References Cited

U.S. PATENT DOCUMENTS 9,046,413 B2 * 6/2015 Nielsen .................. G01C 15/02
10,207,759 B2 * 2/2019 Wang ........................ B62M 6/90
(Continued)

FOREIGN PATENT DOCUMENTS

CA         2424743 A1 *  9/2001
WO     2017217936 A1    12/2017

OTHER PUBLICATIONS

Masataka Hirai et al., "Development of an Intelligent Mobility Scotter", Proceedings of 2012 IEEE International Conference on Mechatronics and Automation, Aug. 5-8, Chengdu, China, 8 pages.
(Continued)

*Primary Examiner* — Adam M Alharbi
(74) *Attorney, Agent, or Firm* — Dentons US LLP

(57) ABSTRACT

The disclosed embodiments relate to detecting sidewalk riding by a personal mobility vehicle (e.g., an electric scooter). For example, a method includes collecting sensor data (e.g., vibration data of an accelerometer) generated by the scooter while traveling on a surface of a travel pathway. The method further includes identifying a surface type by processing the collected sensor data with a computer model that can distinguish among different surface types, and determining that the travel pathway is unsuitable (e.g., a sidewalk) for the scooter based at least in part on the identified surface type (e.g., a pattern of concrete sections). In response to determining that the travel pathway is a sidewalk, causing the personal mobility vehicle to assist the user in navigating the personal mobility vehicle, alter a mobility operation of the personal mobility vehicle, or notify (Continued)

a surrounding area of a presence of the personal mobility vehicle.

27 Claims, 21 Drawing Sheets

(51) Int. Cl.
| | |
|---|---|
| *B62K 11/00* | (2006.01) |
| *B62K 15/00* | (2006.01) |
| *G01C 21/34* | (2006.01) |
| *G01C 21/36* | (2006.01) |
| *G06Q 30/0207* | (2023.01) |
| *B62J 45/20* | (2020.01) |
| *B62J 45/40* | (2020.01) |
| *B62J 50/20* | (2020.01) |

(52) U.S. Cl.
CPC ........ *B62K 15/006* (2013.01); *G01C 21/3602* (2013.01); *G01C 21/3658* (2013.01); *G06Q 30/0207* (2013.01); *B62J 45/20* (2020.02); *B62J 45/40* (2020.02); *B62J 50/20* (2020.02); *B62K 2202/00* (2013.01)

(58) Field of Classification Search
CPC ....... B62K 2202/00; B62J 99/00; B62J 50/20; B62J 45/20; B62J 45/40; G06Q 30/0207
See application file for complete search history.

(56) References Cited

U.S. PATENT DOCUMENTS

| | | | |
|---|---|---|---|
| 11,117,488 B2* | 9/2021 | Whitt | ................... G06V 20/588 |
| 2011/0144907 A1 | 6/2011 | Ishikawa et al. | |
| 2012/0136534 A1 | 5/2012 | Walsh et al. | |
| 2013/0079990 A1 | 3/2013 | Fritsch et al. | |
| 2013/0201316 A1* | 8/2013 | Binder | ..................... G07C 3/02 |
| | | | 701/2 |
| 2014/0355879 A1 | 12/2014 | Agosta et al. | |
| 2016/0080557 A1 | 3/2016 | Sutton | |
| 2017/0010614 A1 | 1/2017 | Shashua et al. | |
| 2017/0010618 A1* | 1/2017 | Shashua | ........... G08G 1/096805 |
| 2017/0124476 A1 | 5/2017 | Levinson et al. | |
| 2018/0174443 A1* | 6/2018 | Fowe | .................... G08G 1/012 |

OTHER PUBLICATIONS

International Preliminary Report on Patentability from PCT/US2019/057285 dated Apr. 29, 2021.

* cited by examiner

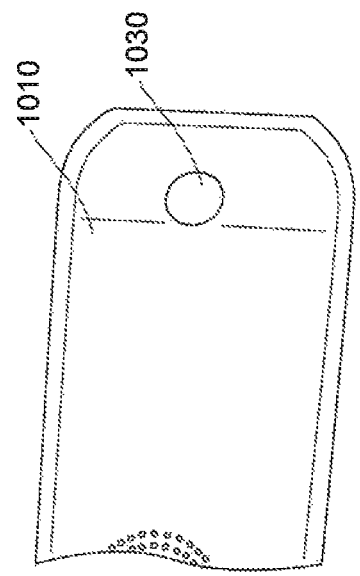
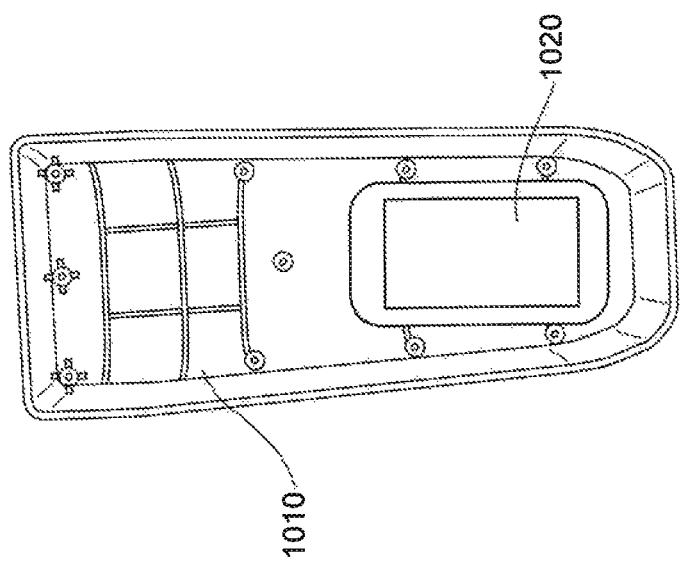
FIG. 10B
FIG. 10A

DETECTING TYPES OF TRAVEL CORRIDORS ON WHICH PERSONAL MOBILITY VEHICLES TRAVEL

CROSS-REFERENCE TO RELATED APPLICATIONS

The present application claims benefit of U.S. Provisional Application No. 62/748,197, filed on Oct. 19, 2018 and entitled "Systems, Methods and Devices for Sidewalk Detection," and U.S. Provisional Application No. 62/870,530 filed on Jul. 3, 2019 entitled "Systems and Methods for Detecting Travel Corridors," which are each hereby incorporated by reference in their entireties.

TECHNICAL FIELD

The disclosed teachings generally relate to techniques for detecting types of travel corridors for personal mobility vehicles (PMVs). The disclosed teachings more particularly relate to improving safety and trip activities by detecting surface types on which PMVs travel and performing actions accordingly.

BACKGROUND

A personal mobility vehicle (PMV) is a means of transportation that offers rapid mobility to users over short-to-medium distances (e.g., 0.5 to 3 miles). PMVs are often electrified (i.e., battery powered) vehicles that are intended for a single rider, such as electric scooters, electric skateboards, and electric bikes. A PMV may be advantageous in urban environments because they enable rapid movement between mass transportation hubs and residences, work locations, recreational areas, or commerce areas.

Operating PMVs in densely populated areas can increase the likelihood of undesired interactions, such as accidents, injuries, and congestion between PMV users and other individuals (e.g., pedestrians) or other vehicles (e.g., automobiles). Moreover, in some areas, PMV usage is limited, restricted, or prohibited by local ordinances or other measures to prevent undesired interactions. Accordingly, it would be advantageous to integrate systems in PMVs to mitigate the likelihood that undesired interactions will occur.

SUMMARY

Disclosed herein are techniques to detect and/or predict types of travel corridors or pathways for vehicles. Examples of the vehicles include personal mobility vehicles (PMVs) such as scooters, bicycles, or transportation pods. Examples of the sensor(s) include accelerometers, gyroscopes, compasses, GPS sensors, inertial measurement units (IMUs), cameras, radar, LIDAR sensors, microphones, voltmeters, amp meters, thermometers, pressure sensors, air flow meters, wheel speed sensors, light sensors, torque sensors, shock sensors, hygrometers, proximity sensors, or inclinometers. In some embodiments, a terrestrial sensing system of a PMV performs at least some aspects of the disclosed techniques. For example, a terrestrial sensing system can include sensors and a processor of a mobile device (e.g., smartphone, tablet) mounted on a PMV.

The disclosed techniques are particularly beneficial in areas of high PMV usage. The behavior of PMV users can be altered to increase the safety of pedestrians and PMV users. In addition, information or feedback about PMV riding activities can be shared with local governments and agencies to help determine infrastructure needs and identify emerging or existing hazards in travel environments. Hence, the disclosed embodiments can help to reduce the risk or incidence of accidents among PMV users and pedestrians.

The terrestrial sensing system can collect surface type data of a PMV while in motion with sensor(s) disposed on the PMV. The surface type data may be processed by computational algorithms to determine whether the PMV is being operated on a sidewalk or another type of travel corridor based on a pattern of the travel surface based on the sensor data. In particular, the terrestrial sensing system can analyze the collected data to determine one or more characteristics of a surface on which the PMV is traveling, has traveled, or is about to travel. The characteristic(s) can include a roughness and/or a structural pattern of a surface. In some embodiments, a type of pathway is determined based on the characteristic(s) of the surface. Examples of types of pathways include a street, bike lane, sidewalk, or trail. In some embodiments, the type of pathway is classified based on an intended use for automobiles, PMVs, or pedestrians. In some embodiments, a surface is determined to be composed of asphalt, concrete, gravel, crushed stone, chip rock, bricks, cobblestones, dirt, mud, sand, rubber, plastic, metal, wood, paint, grass, mulch, or a combination thereof, and may be partitioned into regularly spaced sections.

In some embodiments, data is collected as a PMV travels at low to moderate speeds (e.g., about 1-20 mph). In some embodiments, the data is collected over short distances (e.g., about 10-1,000 ft.) In some embodiments, the data is collected at a frequency range (e.g., less than 1 Hz, about 10-200 Hz, greater than 200 Hz). In some embodiments, the data is analyzed using a ML algorithm. The ML algorithm may include a feed-forward neural network, a convolutional neural network, or a recurrent neural network.

The pattern indicated by the sensor data can be compared to a set of known patterns corresponding to different surfaces for different travel pathways. In some embodiments, a determination about whether a travel pathway is a sidewalk is based on a similarity measure of the sensor data pattern relative to one of the known patterns. A similarity measure that equals to or exceeds a threshold value results in a "match."

The disclosed embodiments can map PMV usage in various travel corridors to, for example, generate a "heat" map of PMV usage. In some embodiments, the mapping data may be utilized to influence, control, or limit PMV usage in certain travel corridors. For example, mapping data can be used to bypass user control and limit a maximum speed of a PMV on a sidewalk when a high pedestrian density is likely or prevent PMV operation on a sidewalk altogether.

The disclosed embodiments include a digital travel map that is layered with location data and a surface fingerprint. The surface fingerprint includes data obtained by the sensor(s) for a surface and indicates roughness of the surface as a function of location on the surface. In some embodiments, the digital travel map includes one or more additional surface fingerprints. For example, a first surface fingerprint can correspond to a first type of surface and a second surface fingerprint can correspond to a second type of surface different from the first type of surface. The digital travel map can indicate surface types including any of asphalt, concrete, gravel, crushed stone, chip rock, bricks, cobblestones, dirt, mud, sand, rubber, plastic, metal, wood, paint, grass, mulch, or a combination thereof.

The disclosed embodiments include a method for controlling a PMV by causing an action based on a determined type of pathway (e.g., street, bike lane, sidewalk, or trail).

The action(s) may be selected from the group consisting of limiting a travel speed of the PMV, stopping the PMV, suggesting a route change, activating a warning signal, activating a warning sound or signal to notify pedestrians of the PMV, displaying a message on a screen or interface of the PMV, issuing a warning or fine for violating an ordinance or a term of a user agreement, or providing a reward or incentive. Another example of an action is a post-trip warning (e.g., notify user to nudge with emails or other forms of communication after the trip), create ratings/scores about the user to regulate/restrict usage of the personal mobility vehicle, etc.

BRIEF DESCRIPTION OF THE DRAWINGS

FIG. 10A depicts a mobile device with a built-in camera secured inside a housing of an electric scooter.

FIG. 10B depicts an aperture of the housing to permit the built-in camera of the mobile device to capture visual data.

DETAILED DESCRIPTION

Figure 1B:
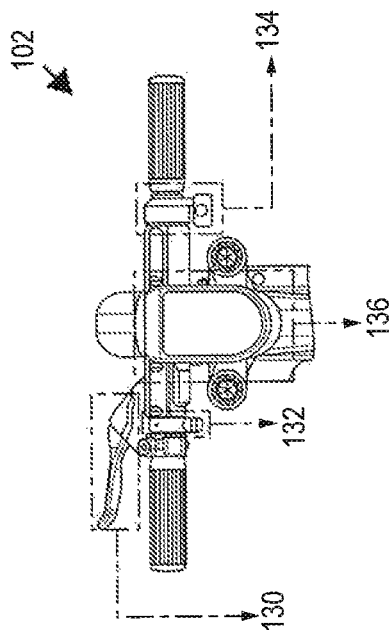
FIG. 1B depicts user-facing components of the PMV.

The description set forth below represents the necessary information to enable those skilled in the art to practice the embodiments and illustrates the best mode of practicing the embodiments. Upon reading the following description in light of the accompanying figures and tables, those skilled in the art will understand the concepts of the disclosure and will recognize applications of these concepts that are not particularly addressed herein. It should be understood that these concepts and applications fall within the scope of the disclosure and the accompanying embodiments.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

As used herein, a "personal mobility vehicle" (PMV) may refer to a class of vehicles designed to provide transport over short-to-medium distances. In some examples, PMVs are battery-powered, wheeled transportation vehicles that offer a trip range from several city blocks to a few miles. As such, a PMV is a means of transportation that gives rapid mobility to users over short-to-medium distances. An example of a PMV is a battery-powered, electric scooter that utilizes hardware, software, and a user interface.

Other examples of PMVs include non-electric bicycles, electric bicycles, standing scooters, sitting scooters, transportation pods, or the like. Generally, PMVs may be configured to accommodate a single user and to travel ten or less miles per transportation trip. PMVs may be most often a "last-mile" transportation solution—a means by which commuters travel from a public transportation hub to a final destination, e.g., a place of employment. Although a PMV may have an intended range of use, the PMV can encompass any range of use. A PMV may be intended for trip lengths of about 0.1 miles (mi), 0.2 mi, 0.3 mi, 0.4 mi, 0.5 mi, 1 mi, 2 mi, 3 mi, 4 mi, or about 5 mi. A motorized PMV may have a maximum range of about 1 mi, 2 mi, 3 mi, 4 mi, 5 mi, 10 mi, 15 mi, 20 mi, or more. A PMV may be intended for use at low to medium speeds. A PMV may be capable of traveling at speeds of about 1 mile per hour (mph), 2 mph, 3 mph, 4 mph, 5 mph, 6 mph, 7 mph, 8 mph, 9 mph, 10 mph, 11 mph, 12 mph, 13 mph, 14 mph, 15 mph, 16 mph, 17 mph, 18 mph, 19, mph, 20 mph, 25 mph, or about 30 mph. A PMV may have a speed of no more than about 30 mph, 25 mph, 20 mph, 19, mph, 18, mph, 17 mph, 16 mph, 15 mph, 14 mph, 13 mph, 12 mph, 11 mph, 10 mph, 9 mph, 8 mph, 7 mph, 6 mph, 5 mph, 4 mph, 3 mph, 2 mph, 1 mph, or less.

A PMV may have a maximum speed in a range from about 10 mph to about 20 mph. A PMV may have a maximum speed in a range from about 15 mph to 17 mph. A PMV may collect data from one or more sensors at a particular speed. A PMV may collect data from one or more sensors at a speed of about 1 mph, 2 mph, 3 mph, 4 mph, 5 mph, 6 mph, 7 mph, 8 mph, 9 mph, 10 mph, 11 mph, 12 mph, 13 mph, 14 mph, 15 mph, 16 mph, 17 mph, 18 mph, 19, mph, 20 mph, 25 mph, or about 30 mph. A PMV may collect data from one or more sensors at a speed of at least about 1 mph, 2 mph, 3 mph, 4 mph, 5 mph, 6 mph, 7 mph, 8 mph, 9 mph, 10 mph, 11 mph, 12 mph, 13 mph, 14 mph, 15 mph, 16 mph, 17 mph, 18 mph, 19, mph, 20 mph, 25 mph, or at least about 30 mph or more. A PMV may collect data from one or more sensors at a speed of no more than about 30 mph, 25 mph, 20 mph, 19, mph, 18, mph, 17 mph, 16 mph, 15 mph, 14 mph, 13 mph, 12 mph, 11 mph, 10 mph, 9 mph, 8 mph, 7 mph, 6 mph, 5 mph, 4 mph, 3 mph, 2 mph, 1 mph, or less.

As used herein, a travel "corridor," "pathway," or "passageway" may refer to a portion of an area or environment through which a PMV can operate. Travel corridors may include different surfaces such as paved roads, dirt roads, gravel roads, paved trails, dirt trails, gravel trails, paved bike paths, paved walking paths, sidewalks, lawns, or any other surface on which a PMV is capable of operating. For example, public passageways may include car lanes, bike lanes, parking lots, or any other areas, paths, or routes that a PMV may reasonably traverse. In some instances, a travel corridor may be geographically limited (e.g., a graded road traversing a steep hillside). In some instances, a travel corridor may be delineated by artificial boundaries such as painted stripes that define a bike lane. A travel corridor may be physically limited by permanent boundaries (e.g., fencing). In some areas or environments, multiple travel corridors may be available to allow a PMV to travel from a first location to a second location (or multiple locations sequentially). In some instances, a PMV can move freely between travel corridors such as moving from a bike lane to a car lane. In other instances, a PMV is confined to a single travel corridor.

A travel corridor that is "suitable" for PMV traffic may refer to a passageway that can safely accommodate such traffic. In contrast, a travel corridor that is "unsuitable" for PMV traffic cannot safely accommodate such traffic or PMV traffic is restricted on that travel corridor.

As used herein, "pattern matching" may refer to locating and comparing a sequence of data among two or more patterns. A match does not have to be exact. Instead, for example, a particular type or number of components of a pattern has to sufficiently match a known pattern to recognize the pattern. For example, a pattern that matches 51% of a known pattern may be recognized as the known pattern. A pattern that matches 81% of the known pattern may also be recognized as the known pattern but with higher confidence compared to the 51% match.

Overview

Figure 1A:
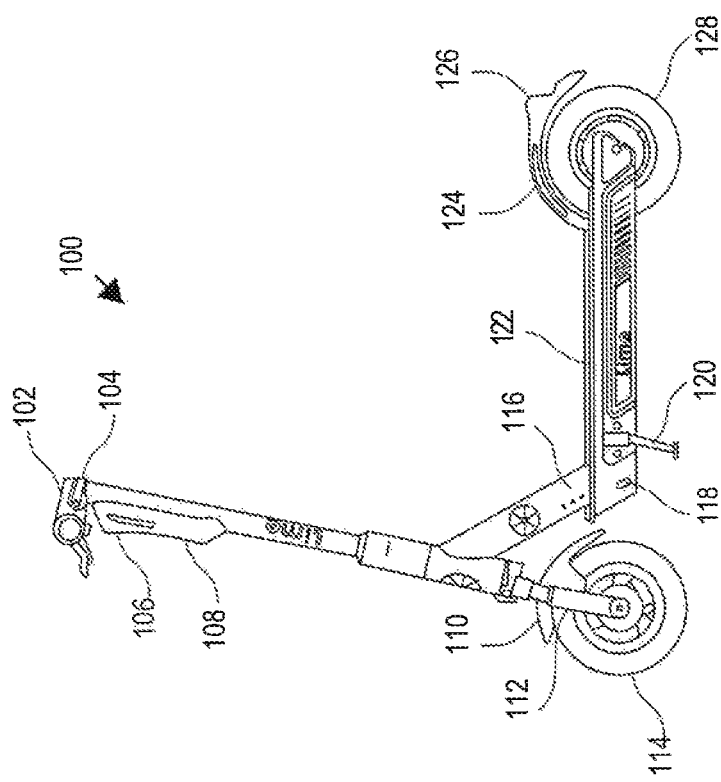
FIG. 1A depicts a personal mobility vehicle (PMV) embodied as an electric scooter.

FIG. 1A depicts a PMV embodied as a battery-powered, electric scooter 100. A forehead 102 of the scooter 100 includes mechanisms to brake or throttle the scooter 100. The forehead 102 includes a dashboard for a user to interface with the electronic components of the scooter 100. The scooter 100 includes a light strip 104 to notify users information about the scooter 100. The user can be a rider or individual that is proximate to the scooter 100 such as a nearby pedestrian. The scooter 100 has a front light 106 configured to illuminate the forward path of a corridor on which the scooter 100 is traveling. The scooter 100 includes a central console 108 that houses hardware and/or software that controls the operations of the scooter 100. The front wheel fender 110 is disposed between a dual suspension system 112 that is coupled to the front wheel 114. The scooter 100 also includes a built-in motor controller 116, charging port 118, kickstand 120, and footboard 122 with a build in battery (not shown). A rear wheel fender 124 enables step braking and a tail light 126 illuminates the rear of the scooter 100. Lastly, the scooter 100 uses rear wheel drive to power the rear wheel 128. In some embodiments, the rear wheel 128 is coupled to an electronic brake (not shown).

PMVs are often interconnected in networks for shared use among users. In some embodiments, a user locates a PMV via a mobile app and then uses the PMV to travel from a current location to a destination location (or multiple sequential locations). A PMV that is parked in one location by a first user can be accessed by a second user to ride to another location. PMV networks are increasingly common in urban areas that overlap with areas of pedestrian presence. Hence, it would be beneficial to restrict PMV usage in passageways that are unsuitable for PMV traffic such as sidewalks or other pedestrian corridors, for the safety and comfort of pedestrians and riders.

PMVs are operable to travel on a variety of travel corridors. In some embodiments, a PMV is equipped with one or more sensors that produce data about the surfaces on which the PMV operates or other environmental characteristics during PMV operation. The sensor outputs include data for predictive algorithms to determine a type of travel surface (e.g. road, sidewalk). In some embodiments, sensors generate data used by a mapping tool for geolocating pedestrian corridors or other zones of restricted operation. In some embodiments, the mapping data is utilized to control where or how the PMV can operate. In some embodiments, PMVs include systems that help maximize the safety of riders and vehicles during operation in environments that include other vehicles or pedestrians by, for example, complying with local riding and parking ordinances.

FIG. 1B depicts user-facing components of the forehead 102 of the scooter 100. The forehead 102 includes a drum brake actuator 130, an audio signal generator 132 (e.g., a bell), and a throttle actuator 134. The scooter 100 incorporates hardware and software in the rider-facing dashboard mounted relative to the forehead 102. The dashboard 136 includes a display device and one or more light emitters (e.g., LED lights) that emit light to indicate a status of the scooter 100. The display device can have a non-touchscreen or a touchscreen (e.g., 2.8-inch) to receive inputs and/or display information to a user. For example, a multicolor LED screen may include in-plane switching (IPS) that is pulsed, can remain on while the scooter 100 is in use or could be turned off. The display device and LED lights may support animations and include a speaker to provide audio to users.

The display device can render a variety of screens or interfaces and notify a user of an operational state or issue. For example, users could be notified when the scooter is malfunctioning, has a low battery charge, or is in a "short-stop" state before scanning with the mobile app. This can be frustrating and may lead to low user conversion. In another example, users may forget to lock the scooter after completing a ride. This could cause the scooter to generate a support ticket and, moreover, result in an unusable scooter long after the completed trip. In another example, users may park scooters in no-parking zones, which can frustrate the city in which the scooter is parked and/or the user (if fined). On the other hand, parking illegally could financially benefit cities (e.g., regulatory authorities).

Although a display device can improve scooter operations, similar functionality is possible without a display device. The power consumption of a display device should not reduce scooter range by any meaningful amount (e.g., no more than about 2.5%) to reserve the majority of the battery for transporting a rider. To understand the performance of a network of PMVs, key performance indicators (KPIs) can be evaluated. Examples of KPIs include a reduced number of scooters that were not locked after rides, a number of scooters scanned by riders that are not available, and a number of scooters scanned by charging stations that are not available for charging. Some custom city experience (CCE) related metrics include a number of scooters that are parked in no-parking zones, ride conversion, no decrease in retention metrics (e.g., including second ride conversion, stickiness).

The disclosed embodiments can mitigate sidewalk riding and control parking corrals. For example, display devices can enable communications with riders to ensure they are riding safely and abiding by city laws (e.g., via the sidewalk detection feature). In some embodiments, a PMV includes technology that can detect whether a rider is riding on a street or sidewalk. With that, the solution can help ensure that users are riding safely and abiding by local riding laws. If incorrectly riding, notifications can be communicated to the users via the display device or some other means of communication. The disclosed embodiments can also determine if the speed of a PMV exceeds an acceptable threshold and could communicate safe riding tips to the user.

The disclosed embodiments can also improve responsible parking with parking corrals. For example, the display device can give riders parking guidance, communicate if they are parked incorrectly so that users can know where and how to park correctly and responsibly. The following are examples of ways that a display device of the PMV can aid and promote safe riding and responsible parking. In one example, a user journey interface is displayed on the display device. Before the ride, if the PMV is operational and ready for a trip, the interface can include a quick response (QR) scan instruction that indicates a current level of charge, whether the PMV is operational, whether the PMV is in maintenance mode, etc. In some embodiments, the PMV can receive over-the-air (OTA) update such as a firmware update that is sent to the PMV through a cellular network. Other display indicators include whether the PMV is ready for charging, paused in-ride, disconnected from a central controller unit (CCU), which can be a box structure on the front of the PMV. In some examples, the CCU can communicate with the server, and control locking and unlocking of the PMV, and control the dashboard.

During an ongoing riding trip, the display device can display a riding meter status that indicates a variety of information. The information can include a battery level, speed, critical warnings (e.g., <20% battery life), errors, upcoming CCE zones (e.g., no parking zone, no riding zone, reduced speed zone), or the like. At the end of a trip, the display device can indicate whether the PMV is stopped for a time duration (e.g., 10 seconds), prompt a user to complete a ride in an app. The display device can also display a remaining power level, and a locked screen indication for another time duration (e.g. 15 seconds) once locking is completed. During a charging mode, the display screen can show a percentage of the PMV battery that is charged.

In some embodiments, LEDs of the PMV are configured in a bar or the like to signal whether the PMV is operable. The LEDs can emit colors that indicate different things to different types of users including riders, chargers, and operators. For example, a green light can indicate that any of riders, chargers, and operators can interact with the PMV, a yellow light can indicate that only chargers and operators can interact with the PMV, and a red light can indicate that only operators can interact with the PMV. In some embodiments, the LEDs can animate lights by pulsing or emitting solid lights, which can indicate if a process is ongoing (riding, charging, OTA, etc.) or if the PMV is idle. In one example, a pulsing light appears as a breathing animation (of varying brightness and/or colors) to indicate that the PMV is operational.

The status of a PMV can be understood based from known illumination patterns. For example, before a ride, a solid green LED is emitted if the PMV is operable for a trip. A solid red LED is emitted if the PMV is not operable or is in maintenance mode. Further, a pulsing red light is emitted if an OTA update is in progress, a solid yellow light is emitted if the PMV has a low battery, and a pulsing green light is emitted if the PMV is reserved or paused in-ride. During the ride, a pulsing green light can indicate that the battery level is above a critical threshold, a pulsing yellow light can indicate that the battery level is below a critical threshold, a pulsing red light can indicate that an error was encountered.

The PMV can also communicate CCE zone information (e.g., a no parking zone) based on a PMV company's collaboration with cities, based on existing city regulations, or based on other sources of similar information. New zone types with custom icons can be easily added via a display interface, as new zone types and areas are defined. The display device or LED bar can communicate custom information. For example, a PMV can emit a pulsing yellow light to indicate a no parking zone, a no riding zone, and/or a slow zone. Upon completion of a ride, a pulsing green light can illuminate until the PMV is locked. In other examples, a pulsing yellow light can indicate that the PMV is in charging mode, and a solid green light can indicate that the battery is fully charged.

The disclosed embodiments can include other communication mechanisms to notify a user of the PMV status. For example, a PMV can include a speaker or other device that emits audible signals. The PMV can emit different sounds to indicate an unlocked state, a locked state, the battery reaching a critical threshold value, entering a CCE zone, being placed in a pause mode, being placed in an un-paused mode, or function to locate the PMV when a user activates a location function from a remote mobile device. In some embodiments, communication mechanisms can prioritize alerts to users when multiple events occur concurrently. For example, the communication mechanisms can prioritize signaling to a rider that a PMV has a low battery over being in a no parking zone.

The alerts can be generated based on outputs from sensor(s) of the PMV. For example, the sensors can output data used to detect travel corridors. The alerts can aid to limit operation of a PMV in non-travel areas including, for example, areas of high pedestrian traffic. Limiting the operation of PMVs in non-travel areas can reduce the likelihood of accidents with pedestrians. In particular, pedestrian corridors can include sidewalks and walking paths. Local ordinances may restrict PMVs from traveling in particular lanes or routes or prohibit usage in pedestrian corridors. In other instances, intelligent sensing systems are used to increase the safety of PMVs by warning users of restricted usage in areas of known hazards, such as in construction zones or nearby potholes.

More specifically, the disclosed embodiments can predict, determine, and/or map surface types of travel corridors that are suitable or unsuitable for PMV transportation. For example, the disclosed systems and methods can determine whether a PMV is being operated on a sidewalk or another surface type where operations may pose a hazard to the user or pedestrians. In some embodiments, the PMV collects sensor data generated while traveling on a travel pathway. The sensor data can have a pattern that matches one of a set of known patterns, where each of the known patterns corresponds to a type of travel pathway. For example, the set of known patterns may correspond to a sidewalk and various non-sidewalks (e.g., roads, dirt trails).

In some embodiments, a determination about whether a travel pathway is a sidewalk is based on a similarity measure of the pattern indicated by the sensor data and one of the known patterns. A similarity measure that equals to or exceeds a threshold value is said to "match." For example, a pattern of roughness data that is sufficiently characteristic of a sidewalk roughness pattern is said to match. A computational algorithm may require, for example, a threshold amount of matching to identify the pattern. Hence, a matching value that is less than the threshold may be recognized as a known pattern but not identified as such to perform an action accordingly. Thus, the PMV can adjust an operation of the vehicle based on a sensor data pattern matching a known pattern.

For example, a PMV is controlled or limited to prevent dangerous situations arising from PMV operations near vehicles or pedestrians. The disclosed embodiments are particularly useful for purposes, including, but not limited to:

- control PMV to reduce or inhibit usage in prohibited areas;
- alter user behavior to operate the PMV more safely in particular situations;
- alter user behavior to incentivize safe conduct and careful stewardship of PMV usage;
- track PMV usage in areas through heat mapping;
- provide PMV usage information to municipal or other local governments;
- facilitate enforcement of local ordinances related to PMV usage;
- notify local governments and agencies of infrastructure needs;
- notify local governments regarding hazards or obstacles in travel corridors;
- improve safety of pedestrians by warning of approaching PMV;
- improve safety of PMV operators with warning of hazards or obstacles while in route;
- decrease number and extent of incidences among PMVs, pedestrians, and other vehicles; and/or
- decrease number and extent of incidences of single-PMV accidents.

Operational Environments

In some embodiments, a PMV has optional modes or settings to optimize performance in particular contexts. For example, a PMV can be set for operating in various settings, such as urban, suburban, semi-rural, and rural settings. A particular setting may be characterized by varying operational parameters, concerns, or hazards, such as vehicle traffic density, pedestrian density, and natural hazards (e.g., bodies of water). A particular setting may contain various regions, areas, or zones. A particular region, area, or zone may be characterized by differing parameters, concerns, or hazards that differ from other regions, areas, or zones within the same setting. For example, an urban area may be bisected by a river, creating limited bridge connections between one side of the river and the other. These bridge connections may be areas of increased vehicle and pedestrian density, thereby creating differing hazards compared to zones adjacent to the river.

A particular region, area, or zone may include one or more travel corridors. In some instances, a particular region, area, or zone may have at least 2, 3, 4, 5, 6, 7, 8, 9, or 10 or more travel corridors. A pair of travel corridors within a particular region, area, or zone may be adjacent, connected, overlapping, crossed, merged, split, divided, or separated. In some instances, a pair of travel corridors within a particular region, area, or zone may be in sufficiently close proximity to each other that the precise travel corridor being used by a PMV cannot be determined from location data (e.g. GPS) alone. For example, a motor vehicle lane, bike lane and sidewalk may all be arranged in an adjacent fashion in a particular area, but a GPS device may not be able to discern which travel corridor a PMV is utilizing during a trip. In other instances, two travel corridors may be sufficiently separate so as to allow determination of the utilized travel corridor based on location data.

In some embodiments, PMV usage may be limited in, restricted in, prohibited in, or confined to particular travel corridors due to, for example, local laws or ordinances or under particular conditions. For example, weather conditions, car traffic density, pedestrian density, construction, travel surface damage, available daylight, or any other condition might be a factor in determining the availability of a travel corridor for PMV usage. In some embodiments, available operational modes for a PMV vary depending on a travel corridor. For example, a PMV may be electrically disabled or restricted to a low speed when traveling on a sidewalk travel corridor.

Figure 2:
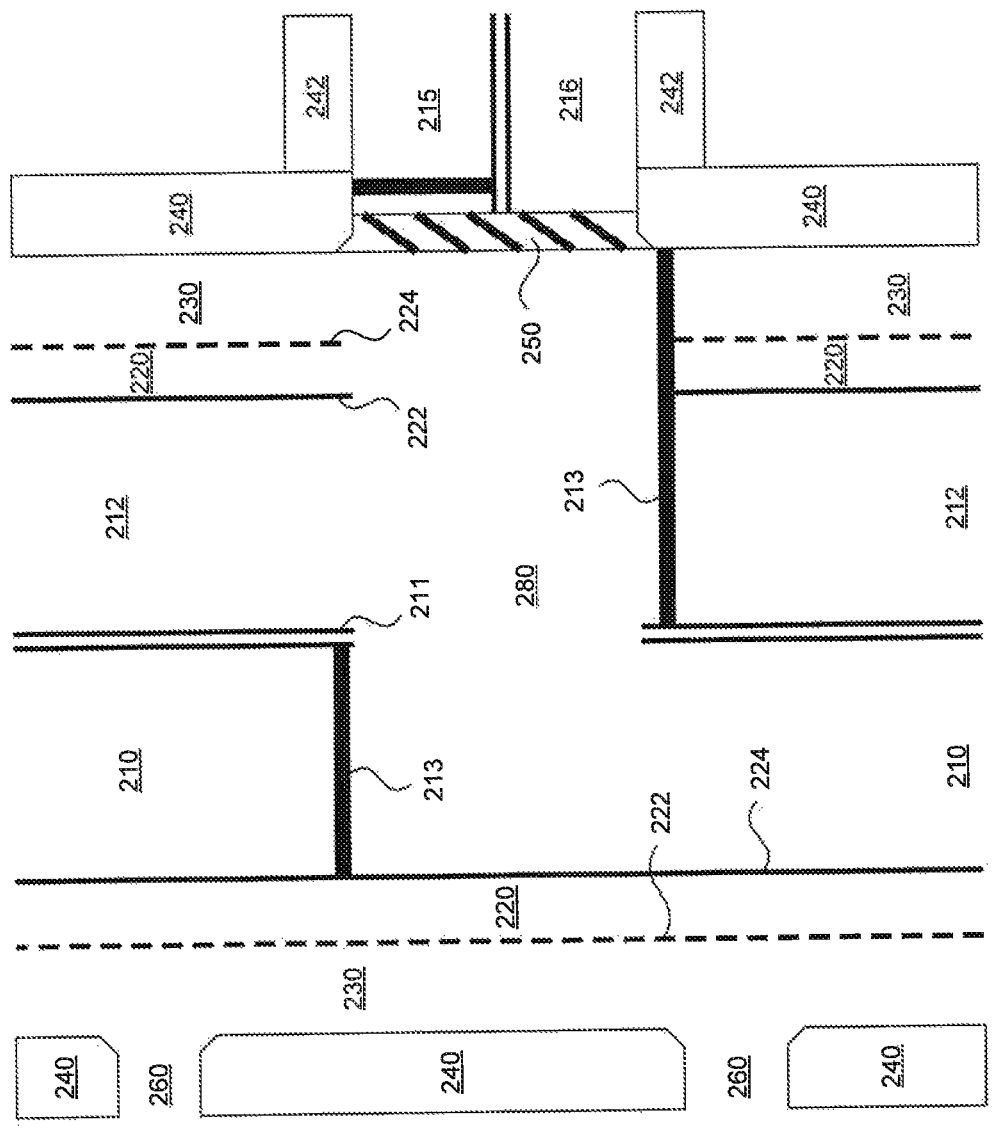
FIG. 2 is a block diagram that illustrates an aerial view of multiple travel corridors for PMV usage.

FIG. 2 is a block diagram that illustrates an aerial view of an exemplary area with multiple travel corridors for PMV usage. The exemplary area 200 might be found in a typical urban environment. A T-intersection 280 occurs where a main road, consisting of a southbound lane 210 and a northbound 212 separated by a center marking 211, meet a side street, consisting of an inbound lane 215 and an outbound lane 216. Both sides of the main road are flanked by bike lanes 220. The bike lanes are delineated by car-side lane markings 224 and curb-side lane markings 222. A buffer lane 230 provides space for parking or other utilities between bike lanes 220 and the main road sidewalk 240. The sidewalks may be traversed by driveways 260. The side road may also be flanked by sidewalks 242. Additional safety markings may exist, such as stop lines 213 and pedestrian crosswalks 250.

A PMV could operate in different combinations of corridors to travel through the T-intersection 280. For example, a PMV could be driven on the road lanes 210 and 212, bike lanes 220, buffer lanes 230, or sidewalks 240. A PMV would be able to turn across the crosswalk 250 to drive up the side road on the outbound lane 216. In some instances, a PMV may be restricted from traveling in a particular travel corridor. For example, a PMV may be prohibited from using the car lanes 210 and 212, or sidewalks 240. In other instances, a PMV may be permitted to use a particular travel corridor. For example, the absence of bike lanes adjacent to car lanes 215 and 216 may encourage PMV traffic on the sidewalks 242.

A travel corridor may include a travel hazard that affects PMV operation or safety. Travel hazards may include, but are not limited to, snow, ice, wet surfaces, standing water, oil or other chemical spills, debris, fallen leaves, vehicle accidents, PMV accidents, high traffic density, high pedestrian density, ongoing emergency operations (e.g., firefighting), construction, limited lighting, and blind or limited visibility corners. Travel hazards may occur randomly (e.g., vehicle accidents) or routinely (e.g., rush hour vehicle traffic). In some cases, a travel corridor has a speed limit for PMVs. In other cases, PMVs are prohibited in a travel corridor or only permitted when walked or pushed by a user.

The surface of a travel corridor is composed of one or more materials. For example, travel corridor surfaces may include one or more combinations of asphalt, concrete, gravel, crushed stone, chip rock, bricks, cobblestones, dirt, mud, sand, rubber, plastic, metal, wood, paint, grass, mulch, any combination thereof. A travel corridor may have a continuous or unbroken surface (e.g., an asphalt-paved road). A travel corridor may have a discontinuous or broken surface. For example, concrete sidewalks are often arranged as large blocks separated by seams. The surface of a travel corridor may include other distinctive surface features including, but not limited to, speed bumps, joints, cracks, potholes, seams, ramps, curbs, drainage gratings, manholes, textured pads, tree roots, gutters, drainage channels, ditches, or train tracks. In some instances, a travel surface may comprise a temporary, non-permanent, or varying surface component, such as standing water, fallen leaves, gravel, mud, sand, or other debris. The features of a surface may have regular or uniform dimensions or aspects. For example, the slope of ramps from roads onto sidewalks may be uniform or consistent in an area. In other instances, the features of a surface may be irregular or non-uniform. For example, cracks or upheavals caused by tree roots may occur irregularly on a sidewalk.

Particular surface materials may have a distinctive surface roughness. A surface roughness may be characterized as the average deviation between an actual surface and a perfectly smooth ideal surface. Surface roughness may be characterized across length scales from small scales (e.g., the roughness of individual aggregate grains on a concrete surface) to larger scales (e.g., the deflection caused by a speed bump). In some instances, surface roughness may be characterized using a roughness index, such as the International Roughness Index (IRI). The IRI may be measured to be the total amount of vertical deflection in a vehicle traveling over a flat surface. It may have units of millimeters of vertical deflection per meter of travel (mm/m). A surface may have an IRI of about 0 mm/m, 1 mm/m, 2 mm/m, 3 mm/m, 4 mm/m, 5 mm/m, 6 mm/m, 7 mm/m, 8 mm/m, 9 mm/m, 10 mm/m, 11 mm/m, 12 mm/m, 13 mm/m, 14 mm/m, 15 mm/m, 16 mm/m, 17 mm/m, 18 mm/m, 19 mm/m, or about 20 mm/m, or more. In some instances, a new, undamaged, or unobstructed surface may have an IRI in a range from about 0 mm/m to about 4 mm/m. In some instances, an old, damaged, or rough surface may have an IRI in a range from about 5-12 mm/m. Surface roughness may be a useful characteristic for distinguishing a travel corridor during PMV operation. For example, an asphalt-paved road may have a lower IRI than a concrete sidewalk thereby allowing PMV travel on the road to be distinguished from travel on the sidewalk.

Sensor Systems

In some embodiments, a PMV has a sensor system that includes one or more different combinations of sensor(s) used to detect travel surfaces. For example, a PMV may collect speed data using a speedometer sensor. The speedometer sensor may be used to estimate the total elapsed distance of PMV travel. The total elapsed distance may be estimated with a line integral or summation of the product of measured speed multiplied by the measured time interval.

A PMV may include various components for its operation. For example, a PMV may include electrical components such as batteries, motors, wiring, switches, sensors, signals, and displays. A PMV may include various control devices, such as power buttons, power switches, throttles, brake handles, brake levers, gear switches, gear levers, outlets, or power cords. A PMV may include various safety features, such as brake lights, turn signals, speed indicators, and warning lights. A PMV may be capable of broadcasting sounds via a speaker system or horn. A speaker system or horn may be used to create warning sounds or signals for the PMV user or pedestrians. A PMV may be capable of providing visual or audio feedback to a PMV user, pedestrian, or vehicle to signify its speed or location. A PMV may be capable of providing PMV user with visual, audio, or tactile feedback to warn of approaching hazards, warn of excessive speed, or communicate required or recommended changes to a travel route.

A PMV may include computer components such as microprocessors and wireless antennae. The PMV may be connected to a mobile device (e.g., a smartphone) via a cable or docking port. In some instances, the PMV may comprise an Internet-of-things (IOT) device. The PMV may be capable of sending data to and receiving data from a centralized computer or server system. The PMV may be capable of sending data to or receiving data from a cloud network. The PMV may include an onboard software system that controls the operation of the PMV. The PMV software system may be remotely updated via wireless over-the-air (OTA) updates. A PMV may be controlled via a centralized computer system that communicates wirelessly with the PMV. A PMV may be controlled via a mobile app stored on a docked mobile device.

Figure 3:
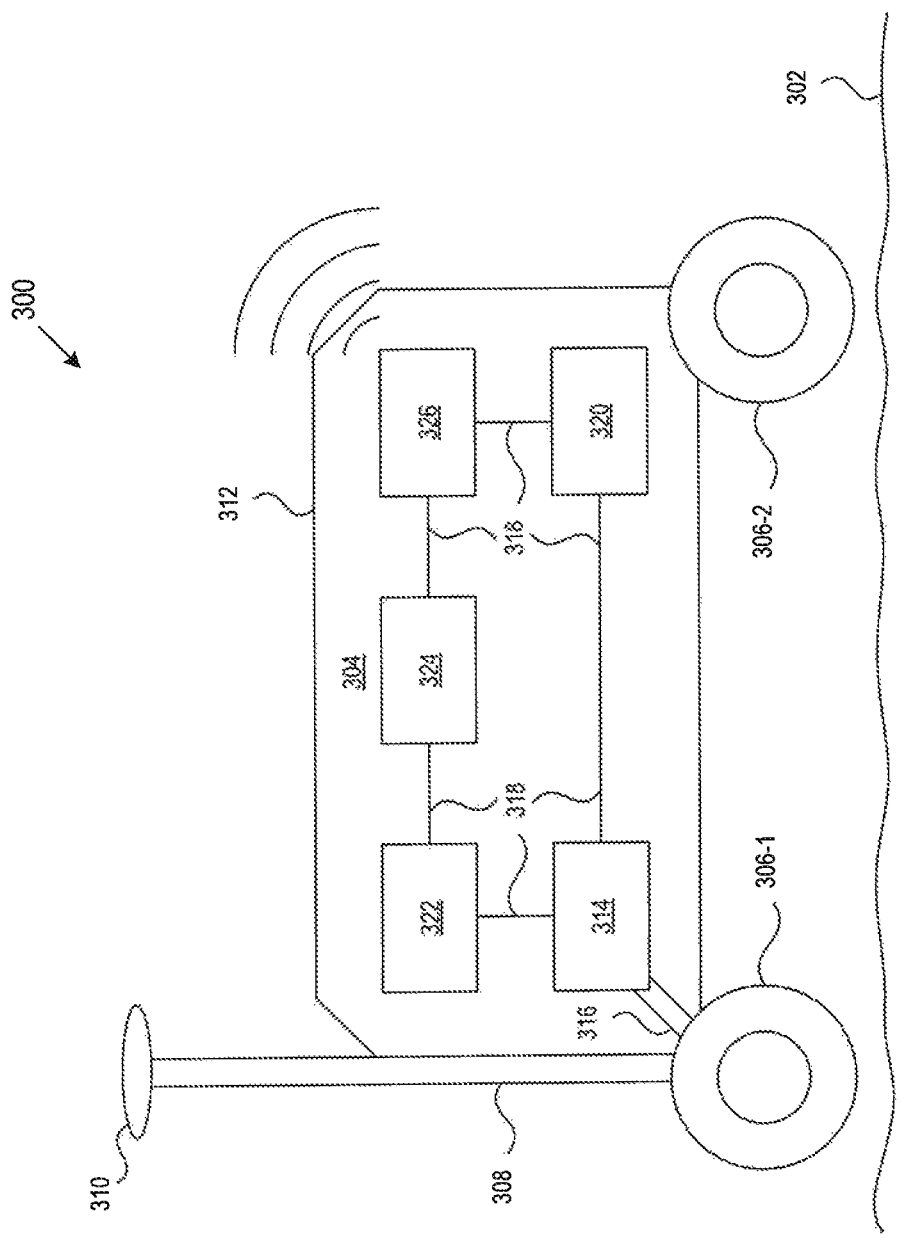
FIG. 3 is a block diagram that illustrates component systems of a PMV.

FIG. 3 depicts a schematic diagram of a PMV 300 embodied as an electric scooter traveling on a travel surface 302. The PMV 300 has a body 304 that is coupled to one or more wheels 306-1 and 306-2. The PMV 300 has a steering system including a steering column 308 and a handle or wheel 310. The body 304 may include a shell or housing 312 that partially or completely surrounds an electrical system. The electrical system may comprise components such as an electric motor 314 connected to a drivetrain 316 that provides motive force to the wheels 306-1 and 306-2. The electrical motor 314 may be connected with wiring 318 to an electrical distribution system 320. The electrical distribution system 320 may also connect to other electrical components such as one or more sensor(s) 322, microprocessors 324, and wireless communication devices 326. The electrical distribution system 320 may include components such as batteries, capacitors, inverters, fuses, and relays, which are not shown herein for the sake of brevity. The PMV may include other components that are not shown herein but would be understood to persons skilled in the art or may omit some components of the illustrated example.

The sensor(s) 322 may perform a wide range of functions including, but not limited to, measuring activity relative to the PMV 300 including any of speed, directional changes, acceleration, battery charge state, power consumption, sensing rider load, tire pressure, available daylight, and wheel torque. Examples of the sensor(s) 322 include accelerometers, gyroscopes, compasses, GPS sensors, inertial measurement units (IMUs), cameras, RADAR, LIDAR, microphones, voltmeters, amp meters, thermometers, pressure sensors, air flow meters, wheel speed sensors, light sensors, torque sensors, shock sensors, hygrometers, proximity sensors, or inclinometers. In some instances, a sensor may be piezoelectric or a microelectromechanical system (MEMS).

In some embodiments, a sensor is secured or coupled to a location of particular advantage on the PMV. For example, a sensor may be secured or coupled to a body segment such as a frame, steering column, or handle bar. Another sensor may be located near a wheel. Yet another sensor may be located near the ground or at any other height that is suitable to achieve a desired operation of the sensor.

In some embodiments, handheld mobile device (e.g., smartphone, tablet) includes some or all of the components required to detect a surface type of a travel pathway. The handheld mobile device can be mounted and coupled to the PMV 300 is coupled to a mobile device. For example, the handheld mobile device may be equipped with sensor(s) that are capable of collecting sensor data, such as that output by accelerometers, gyroscopes, microphones, cameras, and compasses. The handheld mobile device may also be capable of wireless data transmission. Hence, the handheld mobile device can serve to detect surface types.

Figure 18:
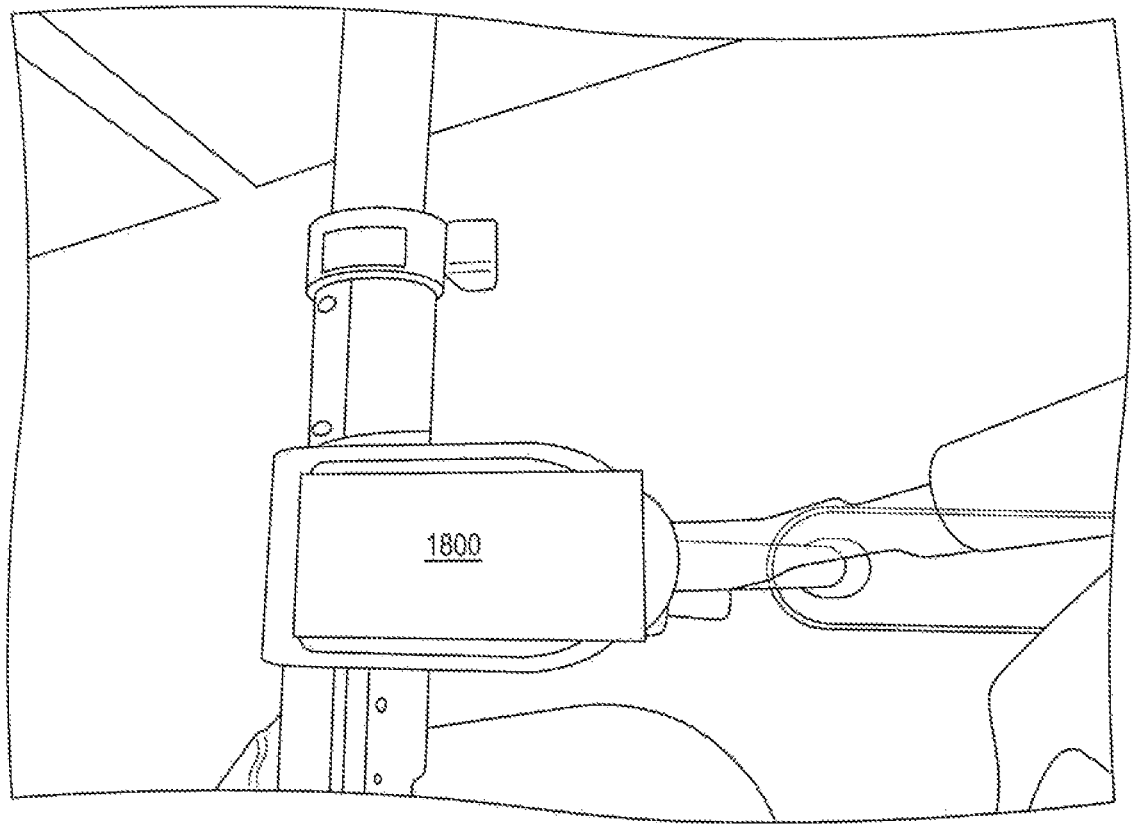
FIG. 18 depicts a user-facing dashboard with an adhesive used to secure a mobile device on an electric scooter housing.

In some embodiments, the sensor(s) 322 are secured to the housing 312 of a PMV 300. The sensor(s) 322 can be secured by a mechanical device such as a clamp or bracket. A sensor may be directly secured to a body 304 component such as a frame using adhesives (e.g. double-sided adhesive 1800 on a rider-facing structural interface as shown in FIG. 18), screws, bolts, or other attachments that hold the sensor position. In some instances, a sensor is partially exposed (e.g. a camera with a view window on the housing 312 to the outside environment). In some embodiments, the camera is fully sheltered or hermetically sealed in the housing 312 to prevent damage from exposure to moisture, dust, oils, and other environmental contaminants. A sensor may be secured along a non-vertical or non-horizontal axis.

A sensor integrated with a PMV can be calibrated to ensure the accuracy of data collection. For example, a mounting orientation of a sensor may require adjusting to a preferred frame of reference. PMV sensor calibration may occur automatically (e.g., without human intervention) or under supervision of a technician, computer, or other system. In some embodiments, sensor calibration may occur automatically via a wireless communication from a remote computer or server system. In some instances, sensor calibration occurs under the control of an onboard computer system or microprocessor. Sensor calibration may occur at a regular interval defined by time elapsed or distance traveled. For example, sensor calibration may occur at least about hourly, daily, weekly, monthly, or yearly. In other example, sensor calibration may occur at least about every 1 mi, 5 mi, 10 mi, 50 mi, 100 mi, 500 mi, 1,000 mi or more. In another example, sensor calibration may occur at defined points in the PMV usage cycle or life cycle. In other examples, PMV sensor calibration occurs after each trip, or at each battery charging cycle of an electric PMV. A sensor integrated with a PMV may offer a particular accuracy. For example, a PMV sensor may have an accuracy in comparison to an independent measurement within about 5%, 4%, 3%, 2%, 1%, 0.5%, 0.1%, 0.01%, or about 0.001%. In another example, a PMV sensor may have an accuracy in comparison to an independent measurement within at least about 5%, 4%, 3%, 2%, 1%, 0.5%, 0.1%, 0.01%, or at least about 0.001%. A PMV sensor may be automatically recalibrated if the sensor accuracy falls outside an acceptable range.

In some embodiments, an accelerometer sensor is disposed in the PMV. The accelerometer is a multi-axis accelerometer such as an n-axis accelerometer, where n is an integer that is equal to or greater than 2. For example, the accelerometer can be a 3-axis accelerometer. That is, the accelerometer can measure acceleration along an X-axis, a Y-axis, and a Z-axis in a local coordinate system that is defined relative to the PMV or the axis along which the accelerometer is mounted.

Accordingly, a motion vector of the sensor data may correspond to an acceleration vector where the magnitude of the motion vector corresponds to a magnitude of the acceleration vector. The acceleration vector may include multiple acceleration components measured along different axes of a coordinate system. For example, acceleration components along the X-axis, Y-axis, and Z-axis may be given by $A_x$, $A_y$, and $A_z$, respectively. Each of the acceleration components may be a vector quantity wherein the magnitude of the acceleration vector $A_m = \text{SQRT}(A_x^2 + A_y^2 + A_z^2)$. The magnitude of the acceleration vector may be a scalar quantity.

In some embodiments, a pitch angle and/or a roll angle of the PMV may be calculated by a computational algorithm or software package using the acceleration components along the X-axis, Y-axis, and Z-axis. In some instances, the pitch angle may be given by $PA = \tan^{-1}[A_y/\text{SQRT}(A_x^2 + A_z^2)]$. In some instances, a roll angle of the PMV may be calculated by using the acceleration components along the X-axis and Z-axis where the roll angle $RA = \tan^{-1}[-A_x/A_z]$. The pitch angle and the roll angle can indicate of a rotational motion of a portion of the PMV about the Y-axis and the X-axis, respectively.

In some embodiments, a gyroscope sensor is disposed on the PMV. Here, a motion vector of the sensor data is an angular velocity vector and the magnitude of the motion vector corresponds to a magnitude of the angular velocity vector. The angular velocity vector may include multiple angular velocity components measured along different axes of the gyroscope. In some embodiments, a pitch angle, a roll angle, and/or a yaw angle of the PMV may be determined based on sensor data based on the gyroscope and/or the accelerometer of the PMV. The pitch angle, the roll angle, and/or the yaw angle can indicate rotational motion of a part of the PMV about an X-axis, a Y-axis, and/or a Z-axis in a local coordinate system that is defined by the PMV.

In some embodiments, sensor data from the PMV may be transmitted to an onboard computer, which may subsequently transmit the sensor data to a cloud network or a remote server. In some embodiments, the sensor data from the PMV may be transmitted directly to a remote analysis engine without processing through an onboard system.

In some embodiments, a sensor of the PMV is a compass or direction-determining sensor such as a 2-axis or 3-axis magnetometer. The magnetometer is a type of sensor that can measure a direction and/or strength of a magnetic field in the vicinity of the sensor. An example of a magnetometer is a solid-state Hall Effect sensor, which can produce a voltage proportional to an applied magnetic field and to sense polarity of the magnetic field. Another example of a magnetometer is a fluxgate magnetometer. Based on the output of the magnetometer, and sometimes other sensor data like accelerometer outputs, a processor of the PMV can compute a magnetic heading, where magnetic heading refers to a device orientation relative to the magnetic meridian that represents direction to the earth's magnetic pole. Other sensor data, such as gyroscope data or data from some other angular rate sensor, can also be used, when available, to filter compass data errors. After a magnetic heading has been determined, the magnetic heading value can be converted into a true heading value relative to the geographical meridian, with the help of a magnetic declination table.

In some embodiments, a PMV integrates an electronic magnetic compass (e.g., a magnetometer) to assist in position location or navigation applications. For example, a PMV may implement a "point-and-click" application where the user points the PMV to a particular object and the PMV software identifies the particular object by using a determined or otherwise known location and time, the heading, and a map database.

In some embodiments, the sensors of the PMV include one or more LIDAR units. The LIDAR units may be single-channel LIDARs, and/or scanning LIDARs. The LIDAR units illuminate a target object or detectable range with laser light. The LIDAR units are capable of detecting backscattering. The light may comprise ultraviolet, visible, and/or near-infrared light to image the surrounding environment. The LIDAR units can detect a wide range of materials. For instance, the LIDAR units may detect metallic or non-metallic objects, precipitation, certain aerosols, clouds or molecules.

In some embodiments, the LIDAR units may operate at a high resolution. Any type of LIDAR unit may be used, such as Rayleigh LIDAR, Mie LIDAR, Raman LIDAR, Na/Fe/K LIDAR, etc. In some embodiments, the LIDAR units are not a mechanical scanning type of LIDAR. For example, the LIDAR units may include phase array LIDARs integrated on microchips. Advantages of phase array LIDARs include lower cost, lower weight, smaller form factor, and fewer mechanical components compared to scanning LIDAR systems (which makes them more robust due to the lack of moving parts since the components are integrated onto microchips).

In some embodiments, the sensors include one or more cameras disposed in a housing of a PMV. The cameras may collectively form part of a vision sensing system. The cameras may be capable of capturing image data for environmental sensing. The cameras may be the same type of cameras or different types of cameras. In some embodiments, the cameras may include stereo cameras. Optionally, the cameras may include one or more monocular cameras. In some instances, combinations of stereo cameras and monocular cameras are employed. The cameras may include black and white cameras and/or color cameras. Any description herein of cameras may apply to any type of vision sensors and may be referred to interchangeably as imaging devices of which examples are described herein.

An imaging device may be a physical imaging device. An imaging device can be configured to detect electromagnetic radiation (e.g., visible, infrared, and/or ultraviolet light) and generate image data (also referred to herein as visual data) based on the detected electromagnetic radiation. An imaging device may include a charge-coupled device (CCD) sensor or a complementary metal-oxide-semiconductor (CMOS) sensor that generates electrical signals in response to wavelengths of light. The resulting electrical signals can be processed to produce image data. The image data generated by an imaging device can include one or more images, which may be static images (e.g., photographs), dynamic images (e.g., video), or combinations thereof. The image data can be polychromatic (e.g., RGB, CMYK, HSV) or monochromatic (e.g., greyscale, black-and-white, sepia). The imaging device may include a lens configured to direct light to an image sensor.

In some embodiments, the imaging device is a camera such as a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments presented herein are described in the context of cameras, it shall be understood that the present disclosure can be applied to any suitable imaging device. For example, any description herein relating to cameras can apply to any suitable imaging device. In some embodiments, a camera can generate 2D images of a 3D scene (e.g., an environment, one or more objects). The images generated by the camera can represent the projection of the 3D scene onto a 2D image plane. Accordingly, each point in the 2D image corresponds to a 3D spatial coordinate in the scene. The camera may include optical elements (e.g., lens, mirrors, filters) and can capture color images, greyscale image, infrared images, or the like. For example, the camera may be a thermal imaging device when it is configured to capture infrared images.

In some embodiments, the sensors for the PMV include a proximity sensor. A proximity sensor may use one or more physical phenomena to determine the distance between an object and the sensor, such as electromagnetic phenomena or ultrasonic phenomena. A proximity sensor may include capacitive sensors, capacitive displacement sensors, Doppler effect sensors, eddy-current sensors, inductive sensors, magnetic sensors, photoelectric sensors, photocell sensors, laser rangefinders, passive thermal infrared sensors, ionizing radiation sensors, sonar sensors, ultrasonic sensors, fiberoptic sensors, or Hall effect sensors. A proximity sensor can detect objects at various ranges. In some instances, a proximity sensor may be able to detect objects at 500 ft, 100 ft, 10 ft, 1 ft, 10 centimeters (cm), or 1 cm or less.

Methods of Data Collection

The disclosed embodiments can detect a surface of a travel passageway based on outputs from a PMV's sensor system. This may be advantageous for a PMV to ensure that the PMV is traveling within a proper travel corridor. In some instances, a surface may be determined by measuring surface roughness during travel. In other instances, visual data is processed with algorithms to accurately determine the surface. In some instances, environmental data is collected to aid in determining where a PMV is operating. Data collected by PMVs facilitate high accuracy mapping of travel corridors in areas of usage or allow heat mapping of PMV usage to allow implementation of routing strategies. In some instances, high accuracy mapping data is utilized to limit the operational modes of a PMV or constrain the travel corridors within which a PMV may travel. Thus, a PMV can collect accurate information about a location and surface characteristics of travel corridors in an area of PMV usage to improve the operation of the PMV.

Figure 4:
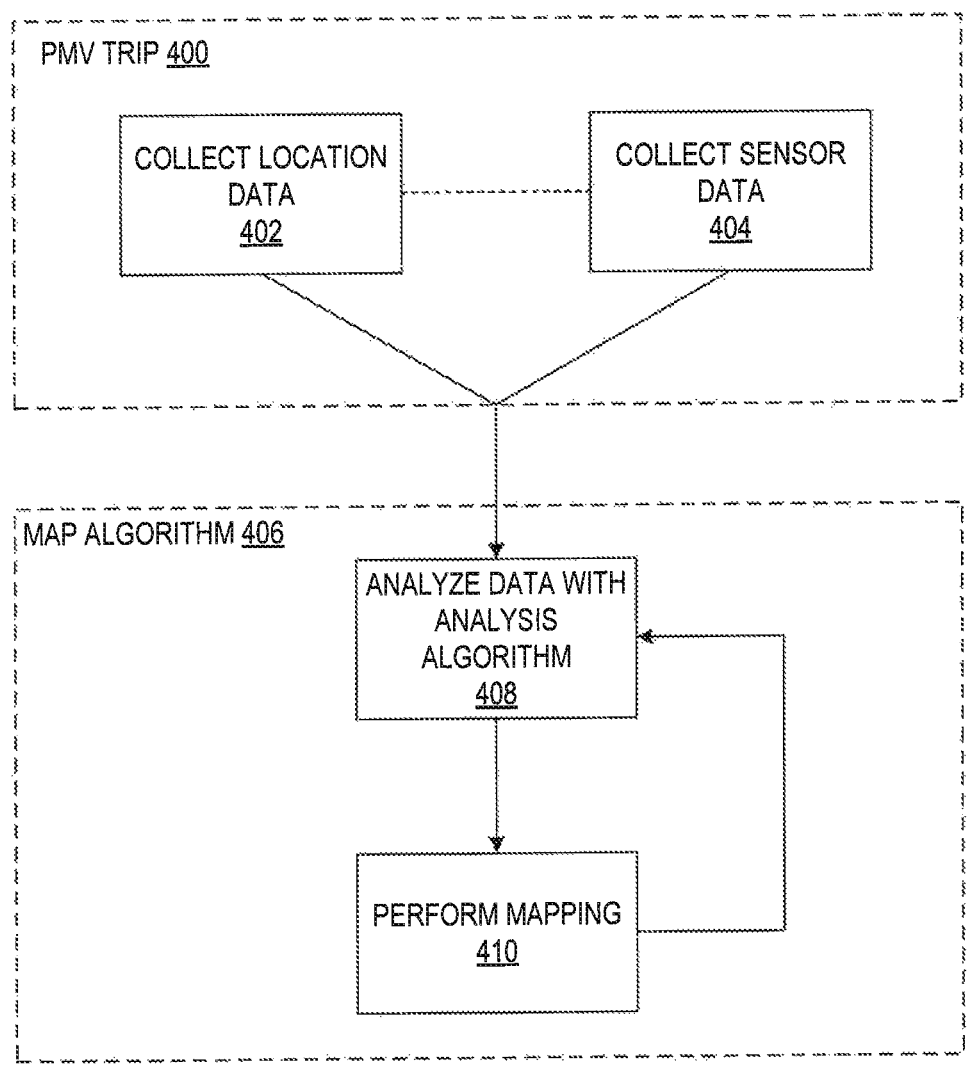
FIG. 4 is a flow diagram that illustrates a method performed by a system to generate a probability that a user of a PMV is on a given surface type.
Figure 5:
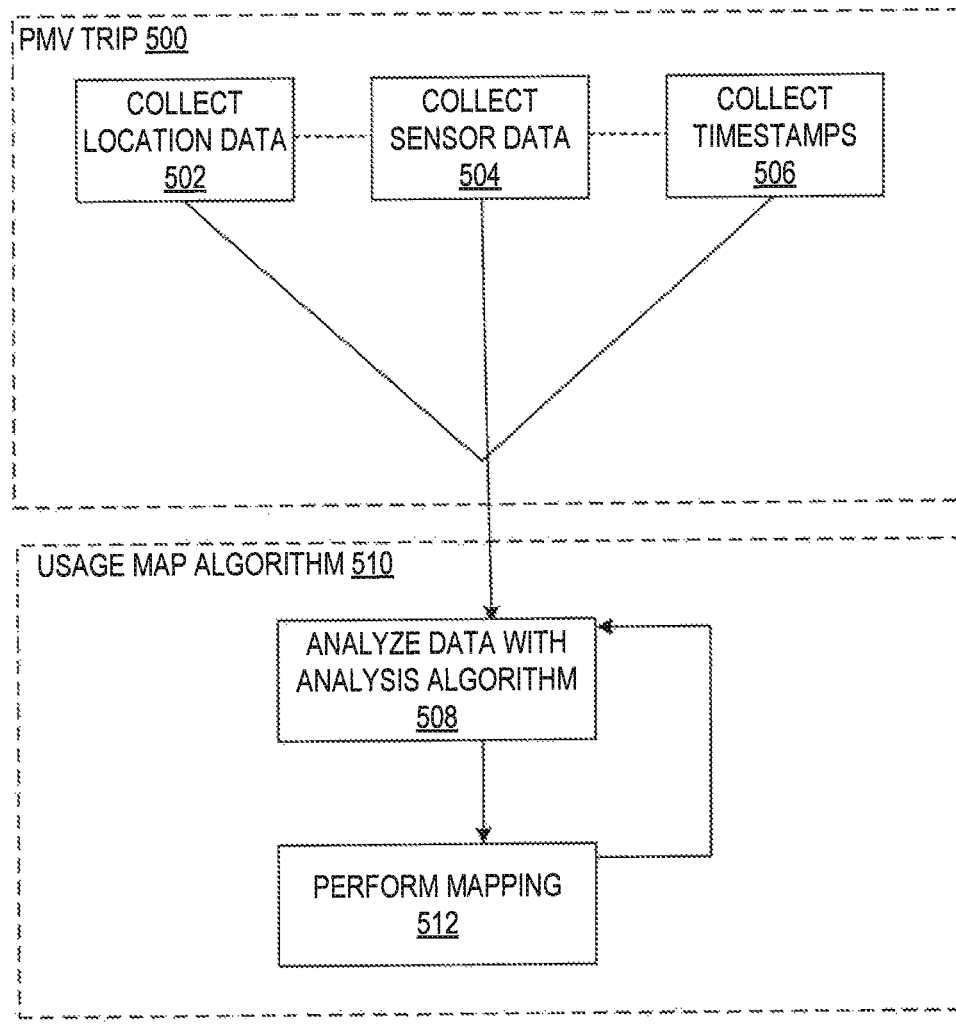
FIG. 5 is another flow diagram that illustrates a method performed by a system to generate a probability that a user of a PMV is on a given surface type.

FIGS. 4 and 5 are flow diagrams that illustrate methods for generating a probability that a PMV is traveling on a given surface type. For example, a PMV equipped with a suitable sensor system can generate sensor data used to generate a probably for location mapping of types of travel pathways. In FIG. 4, during a PMV trip 400, the PMV can simultaneously collect location data 402 and sensor data 404 that is pertinent to characterizing a travel surface. The location data 402 may be obtained from a GPS system or other similar system. The sensor data 404 may be collected from output of accelerometers, cameras, gyroscopes, or other devices.

During the PMV trip 400 or after the trip, the location data 402 and the sensor data 404 are exported to a map algorithm 406 that may include a data analysis algorithm 408. The data analysis algorithm 408 may include a neural network or other training algorithm. The data analysis algorithm 408 may utilize the sensor data 404 to determine the travel surface type as a function of location. Travel surface type information from the data analysis algorithm 408 and the location data 402 may be exported into a mapping algorithm 410 that creates a spatial layout of travel corridors and their surface compositions. The resulting map can be updated at routine intervals or as changes are determined by the data analysis algorithm 408. In some embodiments, the PMV can collect accurate information about the frequency of usage in various travel corridors.

In FIG. 5, the illustrated process for using a sensor system of a PMV to produce a heat map of one or more travel corridors. During a PMV trip 500, a PMV may simultaneously collect location data 502, sensor data 504 that is pertinent to characterizing the travel surface, and timestamp data 506. The location data 502 may be obtained with a GPS system or other similar system. The sensor data 504 may be obtained from accelerometers, cameras, gyroscopes, or other sensor devices. The timestamp data 506 may be recorded by an onboard device or may be recorded by a remote system by data transmission in real-time. The timestamp data 506 may be recorded in local time coordinates or universal time coordinates (UTC).

During the PMV trip 500 or after a trip, the location data 502, the sensor data 504, and timestamp data 506 are exported to a data analysis algorithm 508. The data analysis algorithm 508 may include a neural network or other training algorithm. The data analysis algorithm 508 may utilize sensor data 504 to determine the travel surface type as a function of location. The timestamp data 506, travel surface type information from the data analysis algorithm 508 and the location data 502 may be exported into a map algorithm that creates a temporal display map of PMV usage in travel corridors within the mapping region.

Surface travel type information may update in parallel with the temporal PMV usage map. Temporal PMV usage maps 510 may be updated at a defined time interval to calculate usage changes for travel corridors within the mapping region. The temporal PMV usage maps 510 may update hourly, daily, weekly, monthly, yearly, or at any predefined time interval. The temporal PMV usage maps 510 may be utilized to assess changes in PMV rider behavior due to non-anthropogenic influences such as weather, season, or time of day. The temporal PMV usage maps 510 may be utilized to assess changes in PMV rider behavior due to anthropogenic influences such as local ordinance enforcement, remote speed limit controls, or construction. Input of data into the data analysis algorithm 508 and mapping of data 512 may be a feedback loop that updates the temporal PMV usage map. The map may be used to control or influence usage of PMVs in certain travel corridors. The map may be acquired from various sources including, but not limited to, PMV-generated mapping data or internet-based maps (e.g. GOOGLE MAPS).

Figure 6:
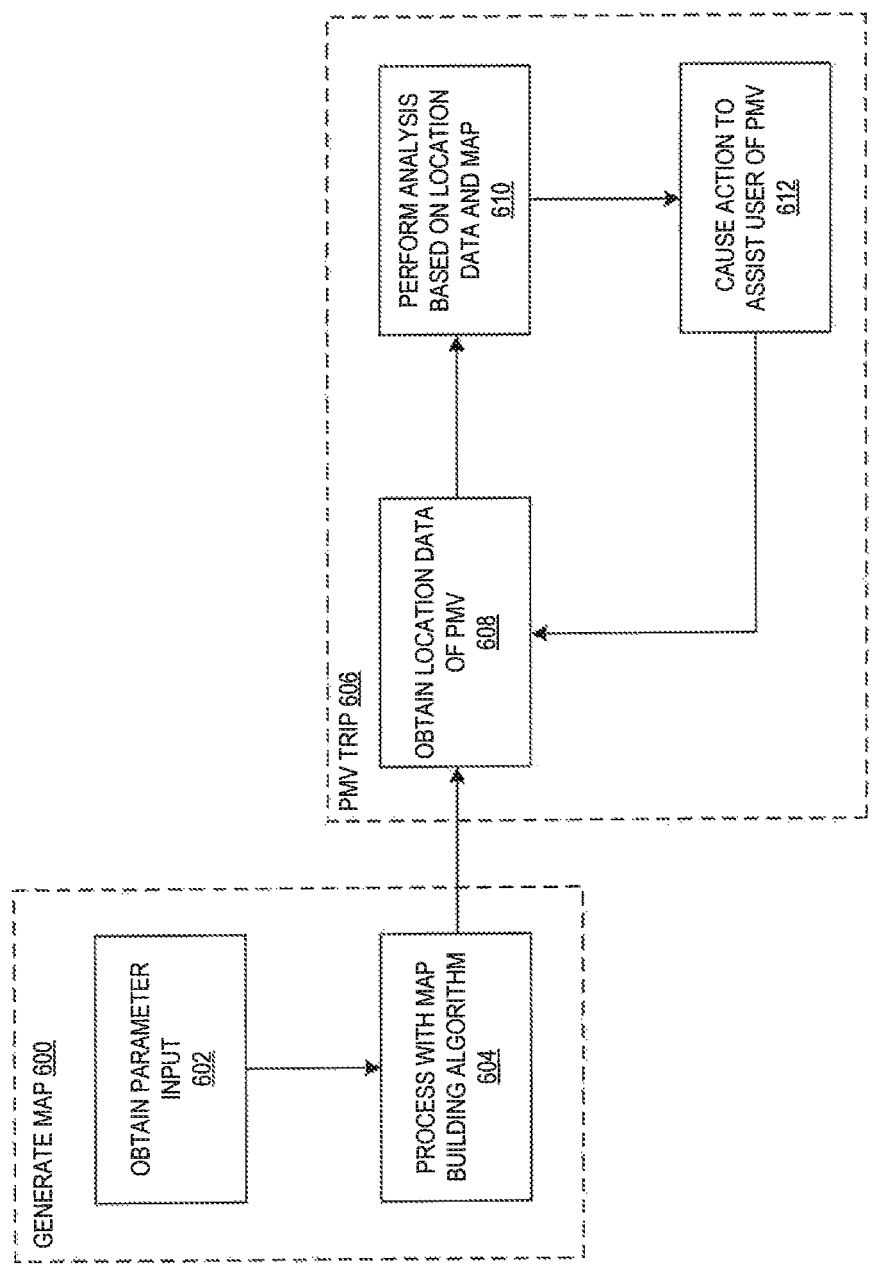
FIG. 6 is a flow diagram that illustrates a method for generating a map that can control or influence operation of a PMV.

FIG. 6 illustrates a process for controlling or influencing PMV usage by utilizing a map based on a map generation process 600. A parameter input 602 is provided from one or more sources (e.g., sensors). The parameter input 602 may include location-based information such as information from local authorities (e.g., travel hazards, weather information, emergency information, and local ordinances). The parameter input 602 may include information from PMV proprietors such as speed limits and travel restrictions (e.g. restricting travel on lawns or dirt surfaces). The parameter input may include information from PMV users such as preferred routing information (e.g., no main roads). The parameter input is then fed to a map building algorithm 604 that produces a map of travel corridors for a PMV operational region.

The map produced by the map building algorithm 604 may include multiple layers of information such as travel corridor locations, travel surface type, speed limits, travel restrictions, construction zones, traffic density, pedestrian density, and other information affecting PMV operation and route choice. The map from the map building algorithm 604 may be uploaded to a PMV to assist a user on a PMV trip 606. The map may be uploaded before, during, or after a PMV trip. The map may be updated in real time as additional parameter inputs 602 cause the map to update.

The map may be updated via wireless transmission to the PMV. The updated map may then be utilized to control or influence PMV usage during a PMV trip 606. For example, as a rider travels using a PMV, location data 606 may be plotted on the uploaded map. The location data 608 may be acquired from any method available, such as GPS. The location data 608 and the map may be fed into an analysis algorithm 610 that determines corrections, modifications, or actions are necessary based upon the travel corridor being utilized by the PMV. In some embodiments, the analysis algorithm 610 is a component of an onboard software package or routine. In some embodiments, the analysis algorithm 610 may be remotely stored on a computer or server. Data may be communicated to a remote analysis algorithm by wireless data transmission. The analysis algorithm may make a determination about the travel corridor or travel surface type during PMV usage. The analysis algorithm 610 may output a command or action 612 that controls, influences, alters, maintains, restricts, or stops PMV travel based upon a determination of the PMV travel surface type.

The command or action 612 for a PMV may include bypassing user control to limit the travel speed of the PMV, stop the PMV, issue an alert that suggests a route change, activate a warning alert signal, activate a warning sound, signal, or other alert to notify pedestrians of the PMV, displaying a message on a screen or interface (e.g. sending a message by SMS or other means of push notification), or issuing a warning alert or fine for violating an ordinance or a term of a user agreement. A command or action may include providing a reward or incentive for desired, preferable, or proper conduct. For example, a PMV user who selects and utilizes a preferred travel corridor or maintains a safe speed in pedestrian areas may receive a discounted rental rate.

A command or action may occur if the analysis algorithm determines that a PMV has been traveling on a particular surface for a particular length of time or a particular number of times. For example, a warning message may issue if the PMV has been determined to be traveling on a sidewalk for at least 15 seconds. A command or action may occur if the analysis algorithm predicts that a PMV has been traveling on a particular surface at a particular confidence level. For example, a display device of the PMV may issue a warning message to move off a sidewalk if the analysis algorithm is 75% confident. The PMV trip 606 may create a feedback loop between location data and commands or actions that influence the PMV trip 606. The behavior of a PMV user may be affected or altered due to the use of the map during the PMV trip 606. For example, a user may select a new route that avoids a prohibited sidewalk when prompted by a message on a display or mobile device. The behavior of a PMV user may alter the operational mode of a PMV utilizing the map during a PMV trip. For example, a PMV may become halted or slowed when a user travels on a sidewalk depending upon local ordinances and pedestrian density.

Collection of Sensor Data

The collection of sensor data may occur via one or more onboard sensors. The sensor data is stored, analyzed, or transmitted over particular distances and at certain frequencies of data capture. In some embodiments, the sensor data is generated continuously. In other embodiments, the sensor data is generated periodically. Sensor-based surface detection may occur due to certain triggering events. For example, a sudden impact, a sudden change in direction, a sudden acceleration or deceleration, or a sustained change in a sensor signal may constitute a triggering event. In some embodiments, sensor-based detection of a surface type may be triggered if a particular sensor reading exceeds a baseline value or averaged baseline value by a predetermined amount.

A sensor reading that exceeds a baseline or threshold value or averaged baseline value may trigger collection of surface detection data if the sensor reading exceeds the baseline or average baseline value one or more times, or for a sustained time period or distance. The sensor data may be collected over a particular distance. For example, sensor data may be collected for about 10 feet (ft), 50 ft, 100 ft, 250 ft, 500 ft, or about 1000 ft. In some instances, sensor data may be collected for at least about 10 ft, 50 ft, 100 ft, 250 ft, 500 ft, or at least about 1000 ft. In some instances, sensor data may be collected for no more than about 1000 ft, 500 ft, 250 ft, 100 ft, 50 ft, or no more than about 10 ft. The sensor data may be collected for a particular time period. For example, sensor data may be collected for about 1 second (s), 5 s, 10 s, 20 s, 30 s, 60 s, 120 s, or about 300 s. In some instances, sensor data may be collected for at least about 1 s, 5 s, 10 s, 20 s, 30 s, 60 s, 120 s, or at least about 300 s. In some instances, sensor data may be collected for no more than about 300 s, 120 s, 60 s, 30 s, 20 s, 10 s, 5 s, or no more than about 1 s.

The sensor data may be collected at a particular frequency. For example, the frequency of sensor data collection may be about 1 hertz (Hz), 2 Hz, 5 Hz, 10 Hz, 20 Hz, 30 Hz, 40 Hz, 50 Hz, 100 Hz, 150 Hz, 200 Hz, 1000 Hz or about 10000 Hz. In some instances, the frequency of sensor data collection may be at least about 1 Hz, 2 Hz, 5 Hz, 10 Hz, 20 Hz, 30 Hz, 40 Hz, 50 Hz, 100 Hz, 150 Hz, 200 Hz, 1000 Hz or at least about 10000 Hz. In some instances, the frequency of sensor data collection may be no more than about 10000 Hz, 1000 Hz, 200 Hz, 150 Hz, 100 Hz, 50 Hz, 40 Hz, 30 Hz, 20 Hz, 10 Hz, 5 Hz, 2 Hz, or no more than about 1 Hz. Sensor data may be collected for one or more periods when making a determination about a travel surface. For example, a travel surface may be analyzed 1, 2, 3, 4, 5, 6, 7, 8, 9, 10 or more times to make a prediction of the surface type. Sensor data for the purposes of travel surface type determination may occur at a regular interval. For example, sensor data may be collected about every 30 s, 1 min, 2 min, 3 min, 4 min, 5 min, 10 min, or more. Sensor data, including methods of data timing, may have an associated accuracy or error. Sensor data and timing data may be accurate to within about 50%, 40%, 30%, 20%, 15%, 10%, 9%, 8%, 7%, 6%, 5%, 4%, 3%, 2%, 1%, 0.5%, 0.1%, 0.01% or less.

The frequency of the sensor data may be collected based on a probability that a sensor will detect the surface type. For example, a statistical model may be applied to determine the frequency of data collection from a sensor coupled to a PMV. In one example, a PMV user may be assumed to randomly move between a sidewalk and another travel corridor and different instances in time. In this case, "random" may be defined as the condition wherein a rider could either be on the road or on the sidewalk and each instant in time is independent of each other. In such a case, a PMV sensor may collect n samples of sensor data from a particular sensor (e.g. a camera). In this case, each of the images has an x % chance of registering as positive for being one the sidewalk, so the chances that the PMV user is detected, D, is given by the relationship: D=100%−(100%−x %)n where D may represent a lower bound for the actual chance of detection.

Figure 19:
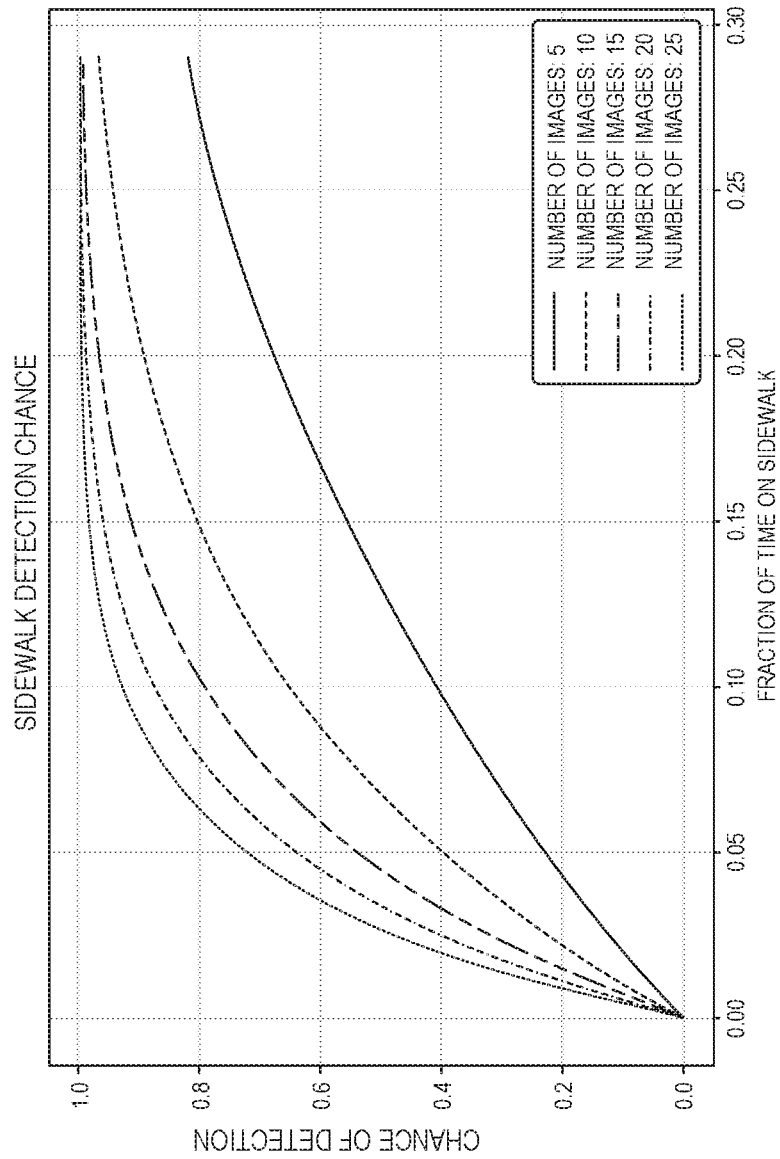
FIG. 19 is a graph that plots predicted probabilities of sidewalk detection based on fractions of time spent on the sidewalk during a PMV trip.

FIG. 19 is a graph of a detection probability for various time fractions (e.g., instances) spent on a sidewalk for a varying number of collected sets of sensor data during a PMV trip. In general, collecting more sensor data increases the likelihood of positively detecting a sidewalk surface type at a lower time spent operating a PMV on the sidewalk surface. In other instances, the probability that a PMV is on the sidewalk at any time instant may be dependent on the result of the previous moment (i.e., the rider will go on the sidewalk for finite segments of time, not random infinitesimal moments of on/off sidewalk). This may increase the probability of a positive detection.

In some embodiments, a surface roughness may be an indicator of the travel surface for a PMV. That is, a particular surface may have a characteristic roughness associated with it. For example, an asphalt with a larger aggregate size may have a higher measured surface roughness than an asphalt with a smaller aggregate size. The surface roughness associated with small-scale features of the surface material may only be detectable via the collection of data from sensors that are capable of measuring high-frequency, low magnitude deflections. The surface roughness may be characterized via the occurrence of less frequent deflections with larger magnitude. For example, a concrete sidewalk may have a characteristic roughness associated with regularly spaced seams between concrete blocks. The seams may create small sensor deflections at uniform intervals. By contrast, larger irregularities on asphalt (e.g., cracks and potholes) may occur randomly but with larger sensor deflection magnitudes.

Medium to high frequency accelerometer sensor data may be utilized to detect characteristic roughness features that may be associated with various surface materials. In some instances, accelerometer data for vertical axis deflection may be measured over a particular time period or distance. In some instances, a determination of surface type may be made by calculating a measure of surface roughness such as an IRI. In other instances, a determination of surface type may be made via a statistical inference. For example, a surface type may correlate with a total number of accelerometer vertical axis deflections of a particular magnitude over a set distance. In another example, the variance in time elapsed between vertical axis accelerometer deflections of a particular magnitude may differ between a regular, segmented surface (e.g., a block concrete sidewalk) and an irregularly variable surface (e.g. cracked asphalt pavement). In some instances, the shape and period of accelerometer vertical axis deflections may be used to characterize a surface. For example, a dirt surface with irregular undulations such as a trail may cause irregular vertical axis accelerometer deflections with longer periods as compared to shorter, sharper deflections on a smoother surface like asphalt.

The surface roughness may also be determined via sensor measurements of energy consumption of a PMV. For example, travel across a rough surface may consume more energy than travel across a smooth surface due to increased frictional dissipation of momentum. Hence, power output, amperage, and battery charge can correlate to surface type. Power output or amperage data may be collected over a particular distance or time period to make a prediction of surface type. In some instances, torque sensor data is correlated to changes in power output for an area, which is correlated to a surface type. For example, surfaces with irregular defects or roughness may have corresponding irregular changes in torque output from an electrical motor.

In some embodiments, particular events may be measured via sensors that allow inference of a surface type or a change from one travel surface to another. For example, PMVs may frequently encounter ramps that permit a change from a road to a sidewalk. Asphalt typically drops convexly to meet the concrete of the sidewalk ramp to create a small channel for rainwater to pass. In this example, inclinometers and accelerometers may sense a surface-associated characteristic such as a rapid drop into the rainwater channel followed by a slower upward incline and acceleration associated with the rise up the ramp. Ramps on to sidewalks also frequently have accessibility pads in urban areas, with a raised bump pattern. In this situation, inclinometers and accelerometers may have a characteristic response to the ramp and accessibility pad. The occurrence of particular events may trigger increased data collection to determine if a change in travel surface has occurred. A sensor measurement exceeding a critical value (e.g., threshold) for a given sensor may trigger data collection by one or more sensors. In some instances, a sensor measurement exceeding a critical value for a given sensor may indicate a change of travel surface. For example, a high vertical accelerometer measurement with a negative slope on an inclinometer may be due to a drop of a curb from a sidewalk surface to an asphalt surface. In such an instance, the accelerometer reading may trigger data collection to determine the travel surface type after the accelerometer critical value event. In some instances, sensor data may be analyzed via a training algorithm or other form of machine learning (ML). In other instances, sensor data is analyzed manually by a human. In other instances, sensor data may be analyzed by a training algorithm or other form of ML and validated by a human. Sensor data may include input from a PMV user that manually characterizes the surface type. For example, a PMV user can record information such as surface type, surface condition, travel speed, vehicle traffic, and pedestrian traffic using a software interface.

An imaging device such as a camera, video recorder, or other visual recording device may be used to collect data on travel surface type during PMV usage. An imaging device may be integrated or coupled with a PMV. An imaging device may be a component of a mobile device such as a mobile phone. In one example, an imaging device may have a focal distance of about 1 in, 6 in, 1 ft, 5 ft, 10 ft, 100 ft, or about 500 ft or more. An imaging device may have a field of vision of about 1 degree (°), 5°, 10°, 30°, 60°, 90°, 120°, 150°, 180°, 270°, or about 360°. An imaging device may have differing horizontal and vertical fields of vision. An imaging device may have an aperture setting of about f-stop 2 (f/2), f/4, f/6, f/8, f/10, f/12, f/14, f/16, f/18, f/20, or about f/22 or less. An imaging device may have a shutter speed of about ISO 1, ISO ½, ISO ¼, ISO ⅛, ISO 1/15, ISO 1/30, ISO 1/60, ISO 1/125, ISO 1/250, ISO 1/500, or about ISO 1/1000 or less. A video recorder or other recording device may have a frame recording rate of about 1 frame per second (fps), 10 fps, 24 fps, 30 fps, 60 fps, 100 fps, 250 fps, 500 fps, 1000 fps, 2000 fps or more.

An imaging device may be oriented such that the device is pointed along a horizontal axis relative to a flat surface. An imaging device may be oriented such that it points above or below a horizontal axis relative to a flat surface. An imaging device may be angled at about 1°, 5°, 10°, 20°, 30°, 40°, 50°, 60°, 70°, 80°, or about 90° relative to a horizontal axis. An imaging device may have a picture resolution of about 0.01 megapixels (Mp), 0.1 Mp, 1 Mp, 5 Mp, 10 Mp, 20 Mp, 40 Mp, 60 Mp, 80 Mp, or about 100 Mp or more. A video recorder or other recording device may have a recording resolution of about 240p, 320p, 480p, 720p, 1080p, 2K, 4K, 8K or more. Visual data captured by an imaging device may be compressed from its original resolution before or after the data is transmitted to a server or software package. A visual data image may have a size of no more than about 1 megabyte (MB), 500 kilobytes (kB), 100 kb, 50 kb, 10 kb, 5 kb, 3 kb or less. An imaging device may record in color or black and white.

The data collected from an imaging device may be used to determine a travel surface type. In some instances, a travel surface type may be determined from a single image or frame from a video recording. In other instances, a series of two or more images or frames from a video recording may be used to determine a travel surface type. A series of images or frames from a video recording may include at least about 2, 3, 4, 5, 6, 7, 8, 9, 10, 15, 20, 25, 50, or 100 or more images or frames. Visual data may be collected in a particular range of wavelengths (e.g., about 400 nm to 700 nm).

In some examples, visual data may be collected in a different range of the light spectrum such as at infrared frequencies (i.e., greater than 700 nm). Visual data may be collected when the PMV is traveling at a particular speed. For example, visual data may be collected at a PMV speed of about 1 mph, 2 mph, 3 mph, 4 mph, 5 mph, 6 mph, 7 mph, 8 mph, 9 mph, 10 mph, 11 mph, 12 mph, 13 mph, 14 mph, 15 mph, 16 mph, 17 mph, 18 mph, 19 mph, 20 mph or more. Visual data may be collected at a PMV speed of at least about 1 mph, 2 mph, 3 mph, 4 mph, 5 mph, 6 mph, 7 mph, 8 mph, 9 mph, 10 mph, 11 mph, 12 mph, 13 mph, 14 mph, 15 mph, 16 mph, 17 mph, 18 mph, 19 mph, 20 mph or more. Visual data may be collected at a PMV speed of no more than about 20 mph, 19 mph, 18 mph, 17 mph, 16 mph, 15 mph, 14 mph, 13 mph, 12 mph, 11 mph, 10 mph, 9 mph, 8 mph, 7 mph, 6 mph, 5 mph, 4 mph, 3 mph, 2 mph, 1 mph or less.

Visual data, such as camera, video recorder, or other recording device data may be collected as a primary method of determining travel surface type. In some instances, camera, video recorder, or other recording device data may be collected at the same time as other data, such as accelerometer or gyroscope data. A secondary sensor may collect data before, during, or after visual data is collected. In some instances, visual data may be analyzed via a training algorithm or other form of ML. In other instances, visual data may be analyzed manually by a human. In other instances, visual data may be analyzed by a training algorithm or other form of ML and validated by a human.

In some embodiments, visual data is analyzed to determine the travel surface type by pattern recognition. For example, particular travel surfaces may have characteristic patterns, morphologies, markings, or other visual cues that allow identification of the travel surface type. In some instances, sidewalks may be identified by orthogonal seam patterns that define the boundaries of individual concrete blocks. Visual cues may include markings such as lane markings, parking spot markings, crosswalk markings, turn lane markings, and other markings applied to travel surfaces. Visual cues may include any feature in a travel corridor that may be positioned relative to a travel corridor. Such visual cues may include parked vehicles, traveling vehicles, pedestrians, streetlight poles, road signs, traffic lights, fire hydrants, utility boxes, power poles, manholes, buildings, fencing, grass, trees, landscaping, walls, traffic cones, impediments, ramps, curbs, joints, bridges, overpasses, underpasses, tunnels, drainage channels, drainage gratings, manholes, refuse containers, bicycle racks, reflectors, and lane dividers. In other instances, visual data including surface color characteristics may permit identification of the surface type. For example, asphalt may have a darker appearance while concrete may have a lighter appearance.

In some embodiments, sound data is utilized as a method of determining a travel surface type. The sound data may be collected using a device such as a microphone. The microphone may operate continuously, at selected intervals, or in parallel with the collection of other data, such as visual data. The sound data may include data in audible frequencies, non-audible frequencies, subsonic frequencies, or supersonic frequencies. Sound data may be recorded in a particular frequency range. Sound data may be recorded in a frequency range from about 1 Hz to about 20 Hz, 1 Hz to about 1000 Hz, 1 Hz to about 10000 Hz, 1 Hz to about 100000 Hz, 20 Hz to about 1000 Hz, 20 Hz to about 20000 Hz, 1000 Hz to about 100000 Hz, or 10000 Hz to about 100000 Hz. Sound data may be recorded at a particular intensity. Sound data may have an intensity of at least about 1 decibel (dB), 10 dB, 20 dB, 30 dB, 40 dB, 50 dB, 75 dB, or at least about 100 dB or more. Sound data may be correlated to PMV travel on particular surface types. A surface type such as asphalt or concrete may cause a PMV tire to emit sound at a particular frequency or in a particular frequency range. Sound data may also be used to detect minor or sudden variations in motor output or wheel torque that may not be detectable by other sensors such as accelerometers.

In some embodiments, a PMV includes one or more sensors capable of obtaining location data. The location data may include position data, speed data, and directional data. The location data may be generated by sensors such as speedometers, compasses, and GPS devices. A GPS system may comprise a real-time kinematic (RTK) GPS device. An RTK GPS device may have a resolution of within 1 cm or less of the actual position of a PMV. Position data may rely upon communication with an external detection device, such as a satellite or communication tower. Position data may be determined by a method such as GPS location or cell phone tower triangulation. Position data may have a particular level of resolution or accuracy. Position data may be accurate to within at least about 500 ft, 400 ft, 300 ft, 250 ft, 200 ft, 150 ft, 100 ft, 50 ft, 25 ft, 10 ft, or within at least about 5 ft or less. Location data may be broken, interrupted, intermittent, or non-existent in certain regions, areas, or zones. Location data sensors may be limited or blocked by obstructions such as cloud cover, interference, electromagnetic shielding, and interruptions to line of sight, such as trees and buildings. Location data may be inferred when a signal is lost with an external detection device by extrapolation between the two data points bracketing an interruption.

In some embodiments, different types of sensor data are combined with location data to develop a characteristic fingerprint of a surface for a travel corridor. In some instances, a PMV may be operated in a region, area, or zone where determination of the travel corridor being utilized is not possible by location data alone. For example, an asphalt bike lane and a concrete sidewalk may be arranged in a parallel, adjacent fashion. GPS data may not be of sufficient resolution to distinguish PMV travel in the bike lane from PMV travel on the sidewalk. In this example, the utilized travel corridor for a PMV may be inferred using the general location data and specific data from one or more sensors.

Figure 7:
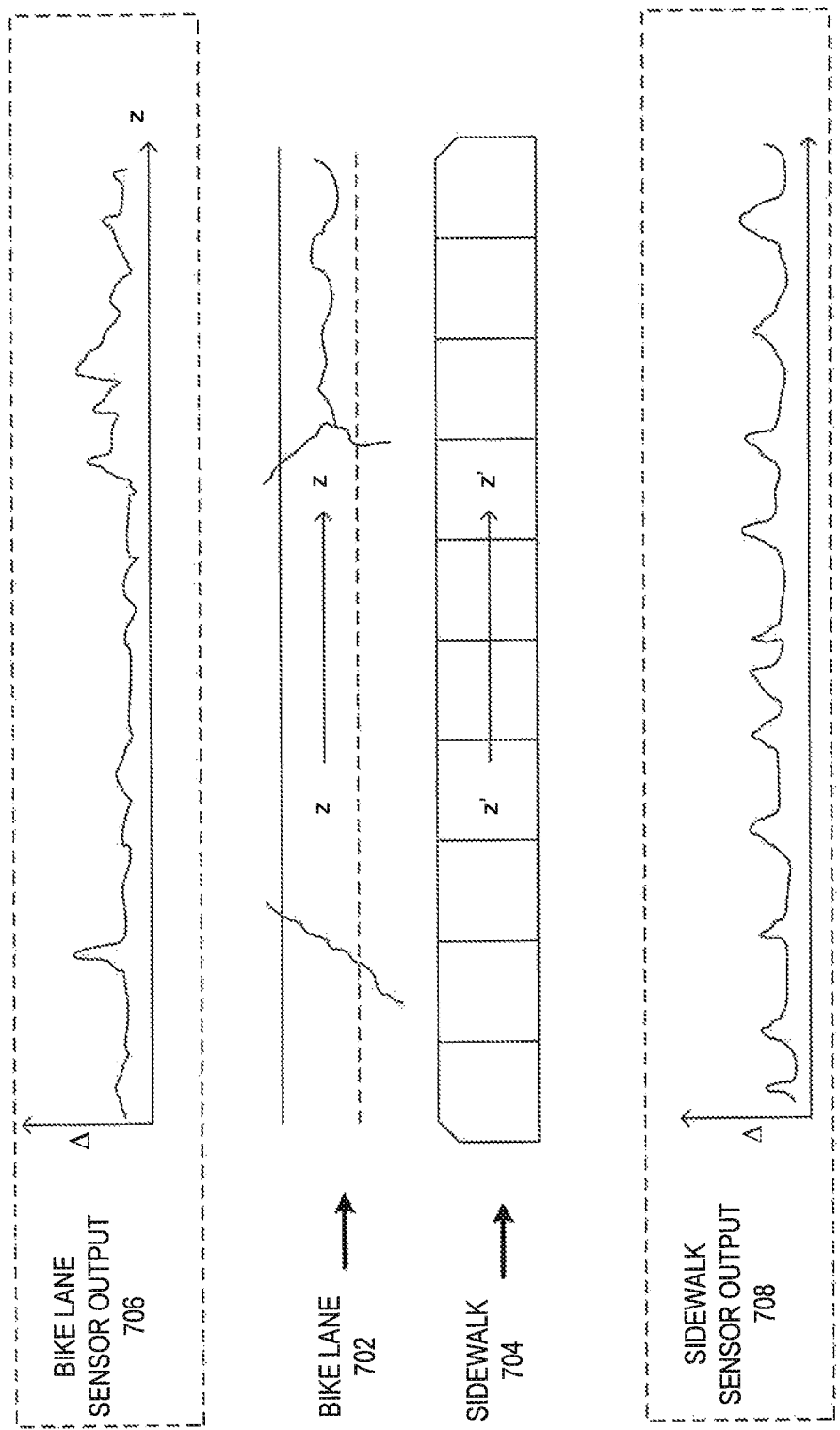
FIG. 7 depicts vibration sensor data collected by a PMV traveling over different adjacent areas with different surface characteristics.

FIG. 7 depicts an example of vibration sensor data collected when a PMV is traveling over two adjacent areas with different surface roughness characteristics. As illustrated, the PMV can travel on a bike lane 702 travel corridor that has an asphalt surface or travel on an adjacent sidewalk 704 travel corridor that is composed of sections of concrete blocks. The bike lane 702 has a substantially smooth asphalt surface with some defects (e.g., cracks) that can transverse or substantially aligned with an axis z-z in the direction in which the PMV travels. The sidewalk 704 has proximal and distal ramps relative to axis z'-z' and regular seams between concrete blocks with some defects.

The graph 706 shows measured values output by PMV-mounted sensor as the PMV travels along the axis z-z in bike lane 702. The sensor may include an accelerometer, gyroscope, or other sensor. The graph 708 shows measured values output by the PMV-mounted sensor as the PMV travels along axis z'-z' on sidewalk 704. In this example, the graph 706 shows more random roughness variations due to the nature of the asphalt roughness, as compared to the more regular roughness due to the regular seams between the concrete blocks. Consequently, the disclosed embodiments can distinguish between the PMV traveling on the bike lane 702 or the sidewalk 704 by combining the outputs of sensor data with known characteristics based on location data (e.g., urban layout).

A surface fingerprint may be created by the simultaneous collection of location data and sensor data from one or more sensors. A surface fingerprint may be defined as a specific combination of location data and data from one or more sensors that is unique to a travel corridor and permits identification of the travel corridor. For example, the overlaying of GPS data with the data in graphs 706 and 708 may create two unique surface fingerprints for that street that allow distinction between PMV usage in the bike lane and PMV usage on the sidewalk. Sensor data may include surface roughness data, energy consumption data, visual data, or sound data. A surface type may be determined via an ML method using sensor data. Surface type determinations may be associated with a surface fingerprint to generate a map of travel corridors in a region, area, or zone where PMV travel may occur. A map of travel corridors that contains surface fingerprint data may be utilized to alter, influence, or control PMV usage within a particular travel corridor as described elsewhere in the specification. A travel map containing surface fingerprint information may include a digital map that further comprises various layers of digital information such as surface roughness information, hazard information, and traffic or pedestrian density information.

Computational Algorithms

The disclosed embodiments include systems and processes that utilize a computational algorithm or ML method to analyze and synthesize information pertinent to the usage of PMVs. The computational algorithm or ML method can predict a travel surface type by utilizing data from one or more sensors. The computational algorithm or ML method can have a measurable accuracy rate or achieve a desired level of skill. In some instances, a computational algorithm or ML method has a true-positive accuracy rate, which is defined as the probability that a computational algorithm or ML method will make a proper prediction or identification when supplied at least one or more points of data. A computational algorithm or ML method may have a true-positive accuracy rate of, for example, at least about 50%, 60%, 70%, 80%, 85%, 90%, 95%, 96%, 97%, 98%, 99%, 99.5%, or at least about 99.9% or more.

In some instances, a ML method may be utilized for PMV travel surface prediction if it has a true-positive accuracy rate of at least a selected threshold (e.g., about 80%). In some instances, a computational algorithm or ML method may have a false-positive accuracy rate. A false-positive accuracy rate may be defined as the probability that a computational algorithm or ML method will make an incorrect prediction or identification when supplied at least one or more points of data. A computational algorithm or ML method may have a false-positive accuracy rate of no more than about 50%, 40%, 30%, 20%, 15%, 10%, 5%, 4%, 3%, 2%, 1%, 0.5% or no more than about 0.1%. In some instances, a ML method may be utilized for PMV travel surface prediction if it has a false-positive accuracy rate of no more than about 10%. In some instances, a true-positive or false-positive accuracy rate may be determined by comparison to a data set categorized by humans.

Figure 8:
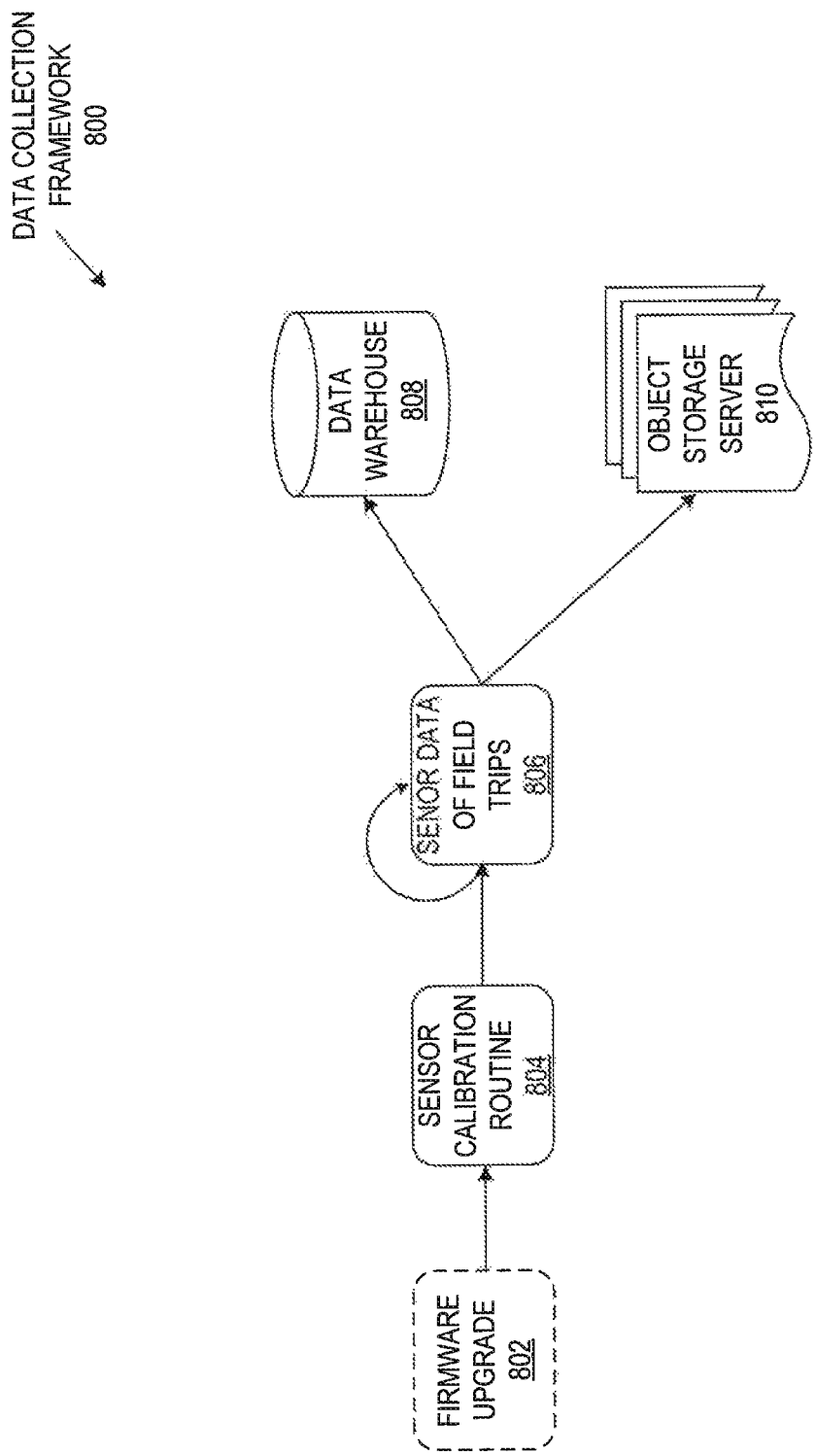
FIG. 8 is a flow diagram that illustrates a data collection framework for transmitting PMV sensor data to a cloud network or database.

An ML algorithm may utilize data obtained by a server or network from one or more PMVs. FIG. 8 is a flow diagram that illustrates a data collection framework 800 for transmitting PMV sensor data to a cloud-based network or database. In the illustrated example, an optional firmware upgrade 802 is provided to the operating system of a PMV. The firmware upgrade 802 may provide new instructions or methodologies for data collection from one or more sensors of the PMV. Data collection may also include a sensor calibration routine 804 to ensure uniformity of data across PMVs. The data collection of users on field trips 806 is collected. The collected data is then stored in a data warehouse 808 and/or an object storage server 810. For the data warehouse 808, every trip could be labeled as either a sidewalk trip or a road trip. In some embodiments, an end-trip picture is further captured as a backup to verify the trip. For the object storage server 810, sensor data (e.g., accelerometer or speedometer data) is stored along with a trip identifier as part of file metadata.

Figure 20:
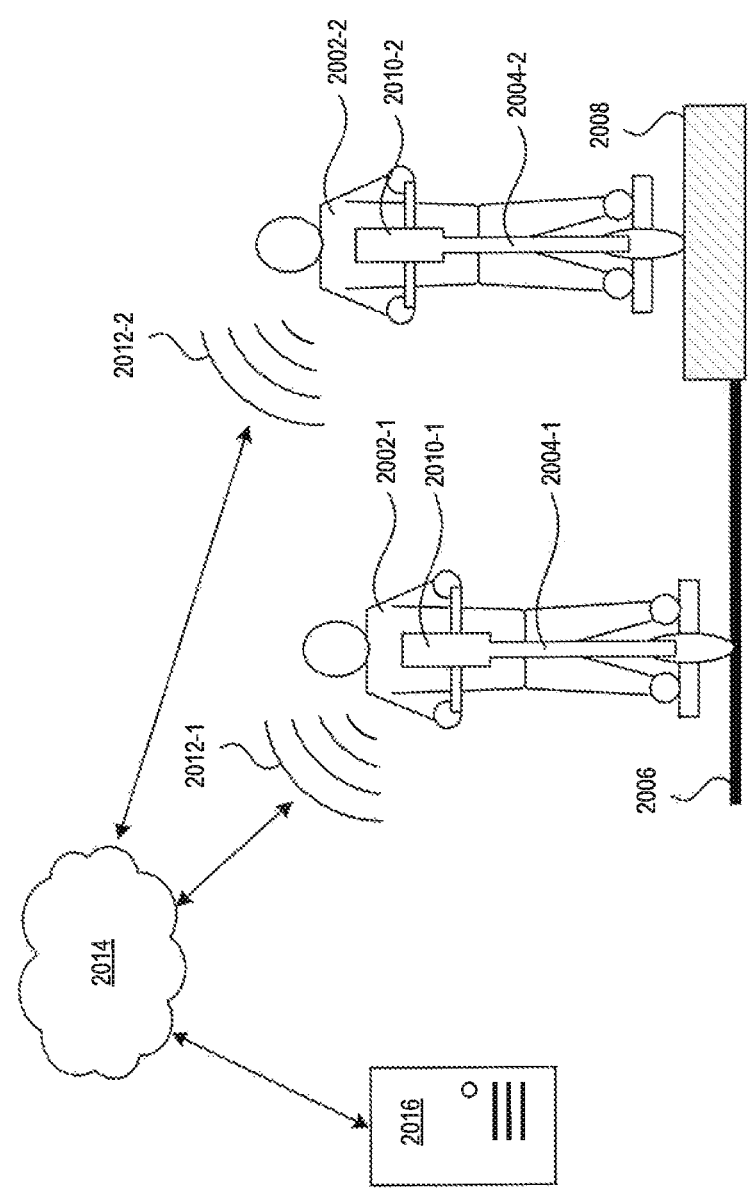
FIG. 20 is a block diagram that illustrates multiple PMVs operated on different travel corridors where each PMV transmits sensor data to a remote computer network.

FIG. 20 depicts an embodiment wherein multiple PMV operators 2002-1 and 2002-2 ride scooters 2004-1 and 2004-2 on different travel corridors such as a bike lane 2006 and a sidewalk 2008, respectively. Each scooter 2004 may have a transceiver 2010-1 and 2010-2 (e.g., included in a standalone mobile device) that cn wirelessly transmit sensor data 2012-1 and 2012-2, respectively, from one or more sensors to a cloud network 2014. The sensor data 2012-1 and 2012-2 may be transferred from the cloud network 2014 to a computer system 2016 that operates an ML algorithm. The data is transferred to a database or cloud-based server where it is stored and prepared for analysis in a computational algorithm.

A ML algorithm may be trained based on the collected dataset. A training dataset for a surface type determination ML algorithm may include data collected from one or more sensors including, but not limited to, location data, vibration data, speed data, sound data, visual data, energy consumption data, radar data, gyroscopic data, and inclinometer data. A training dataset for a surface type determination ML algorithm may be sufficiently large to develop a desired level of skill or accuracy. A surface type determination ML algorithm may require a training dataset of sensor data from one or more sensors on a PMV from 1 PMV user-trip, 10 PMV-user trips, 100 PMV user-trips, 1,000 PMV user-trips, 10,000 PMV user-trips, 25,000 PMV user-trips, 50,000 PMV user-trips, 100,000 PMV user-trips, or more. Moreover, a surface type determination ML algorithm may require a training dataset of sensor data from one or more sensors on a PMV of at least about 0.01 mi, 0.1 mi, 1 mi, 10 mi, 100 mi, 1,000 mi, 10,000 mi or more worth of PMV usage.

The surface type determination ML algorithm may require a training dataset of sensor data from one or more sensors on a PMV for about, for example, 0.01 hrs, 0.1 hrs, 1 hrs, 10 hrs, 100 hrs, 1,000 hrs, 10,000 hrs, 100,000 hrs or more worth of PMV usage. In some embodiments, a surface type determination ML algorithm may require substantially equal amounts of data for each surface type that the algorithm will be trained to recognize. A surface type determination ML algorithm may require different amounts of data depending upon the surface types that the algorithm will be trained to identify. For example, an algorithm may be trained with a training dataset including asphalt vibrational data and concrete vibrational data in a 50:50 ratio. In other instance, the ratio may be about 10:90, 25:75, 60:40, 40:60, 75:25, or about 90:10. The quantity of data may be calculated on various measures, such as data size, number of PMV trips, number of PMV miles, and total elapsed time of PMV usage.

The disclosed embodiments may include a computer algorithm for predicting or determining a surface type by using data acquired during PMV usage. Exemplary models are referenced, but the computational techniques utilized may comprise any appropriate method for obtaining the desired level of skill for surface type determination. Computational algorithms may comprise trained or untrained models, including statistical and stochastic models. A computational algorithm may include a ML algorithm. The ML algorithm may be supervised, semi-supervised, or unsupervised. A computational algorithm may be trained or inferential.

The disclosed embodiments may utilize statistical analysis techniques or a ML analysis to process data or generate predictions. The statistical methods may utilize Monte Carlo methods or other types of models to provide useful information by processing input data. In some embodiments, a statistical model may comprise a Hidden Markov model (HMM). An HMM may be utilized to predict multiple of one or more hidden states from noisy observations that are dependent om hidden states. An HMM is defined by a set of outcomes that are state-dependent where outcomes are observed and are probabilistically related to hidden states. Training an HMM produces probability distribution mapping of the hidden states to observed outcomes, allowing the state of the system to be predicted from multiple of one or more outcomes. In order to estimate the probability of distribution of the HMM, a training algorithm may be utilized. In some examples, a training algorithm includes an expectation-maximization algorithm that iteratively estimates a probability distribution until convergence with a training set's probability distribution is achieved (e.g., the Baum-Welch algorithm). In some embodiments, an HMM may be used to predict a surface type in a travel corridor during PMV travel.

In some embodiments, ML models or other computational algorithms are utilized to detect surface types based on data inputs (e.g., sensor data, location data). An artificial neural network of a model can process input data to make decisions. Examples of neural networks include a feedforward neural network, a convolutional neural network (CNN), or a recurrent neural network. A feedforward neural network has connections between nodes that do not form a cycle. In contrast, a recurrent neural network forms a directed graph along a temporal sequence. Unlike feedforward neural networks, recurrent neural networks can use their internal state (memory) to process sequences of inputs. Further, CNN is a class of deep neural networks that is commonly applied to analyzing visual imagery. In one example, CNNs can analyze sensor data of a surface to obtain a prediction. Generally, a CNN can be implemented to recognize everyday objects in scenes and suggest relevant labels for recognizable objects. In this disclosure, CNNs can be used to train/recognize sensor data and/or train/learn patterns for surface types to subsequently detect sidewalks. In another example, regression analysis can be utilized for prediction and forecasting in a manner that substantial overlaps with machine learning.

In general, neural networks can classify travel surface types by classifying related data (e.g., sensor data obtained during a PMV trip). A neural network can be trained by comparing ML model predictions with reference training data sets. In some embodiments, by calculating an error function, any discrepancy between ML model performance and reference data can be back-propagated through the neural network over several cycles to influence the value of the predicted output. A neural network may cease training when model predictions meet a convergence condition (e.g., small error values). In some embodiments, multiple, layered neural networks (e.g., CNNs) constitute a deep learning network that thereby increases the predictive power of the ML algorithm.

Figure 9:
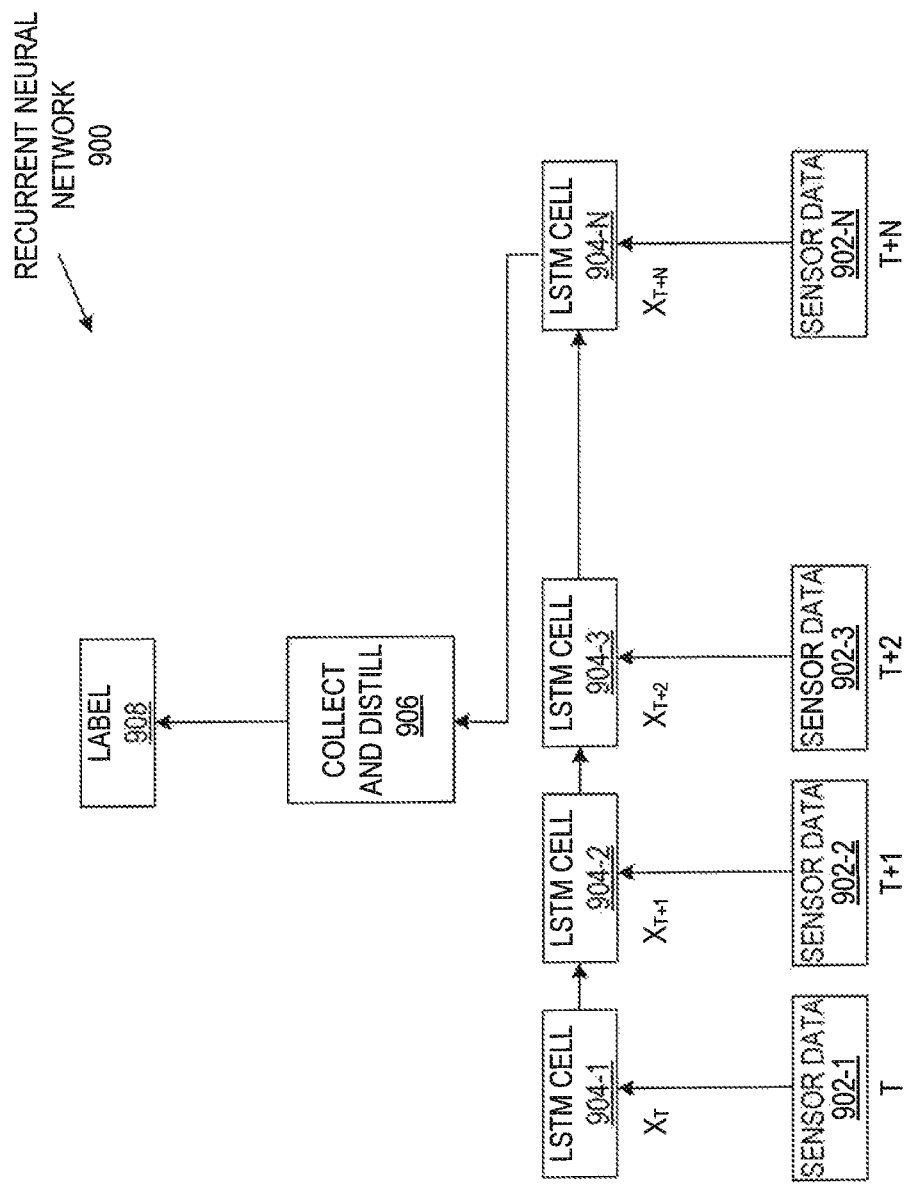
FIG. 9 is a flow diagram that illustrates an example of a machine learning (ML) algorithm for detecting surface types based on PMV sensor data.

FIG. 9 is a flow diagram that illustrates an example of a recurrent neural network for detecting surface types based on PMV sensor data. As shown, the illustrated recurrent neural network 900 includes sensor data 902-1, 902-2, 902-3, 902-N obtained from sensors at various times t, t+1, t+2, and t+N, respectively. The sensor data 902-1, 902-2, 902-3, 902-N is feed into long short-term memory (LSTM) cells 904-1, 904-2, 904-3, 904-N, respectively. After sufficient data has been collected and distilled 906, the recurrent neural network produces a label 908 for the surface type. The label 908 may be given a particular confidence value.

In some embodiments, additional ML algorithms and/or statistical models are utilized to detect surface types by using PMV sensor data. Examples of ML algorithms include logistic regressions, classification and regression tree algorithms, support vector machines, naive Bayes, K-nearest neighbors, and random forest algorithms. The algorithms can be used for many different tasks, including data classification, clustering, density estimation, or dimensionality reduction. In some embodiments, ML algorithms are used for active learning, supervised learning, unsupervised learning, or semi-supervised learning tasks.

EXAMPLES

Collection of Visual Data from PMV-Mounted Sensors

In one embodiment, a mobile phone device embodies at least some aspects of the disclosed technology and is disposed in a housing of an electric scooter. The housing has an aperture with a field of view facing away from the front of the scooter. A camera of the mobile phone (or another imaging device) is positioned such that the aperture acts as a visual window for the camera to collect visual data for the mobile device.

FIG. 10A depicts a mobile device 1020 with a built-in camera secured inside a housing 1010 of an electric scooter. FIG. 10B depicts an aperture 1030 of the housing 1010 that permits the built-in camera of the mobile device 1020 to capture visual data. The mobile device 1020 is secured at a position such that its camera is angled downward toward the travel surface of the electric scooter. The downward angle of the camera is determined to prevent the incidental collection of identifying information from pedestrians that might be in the vicinity of the electric scooter during operation.

Figure 11:
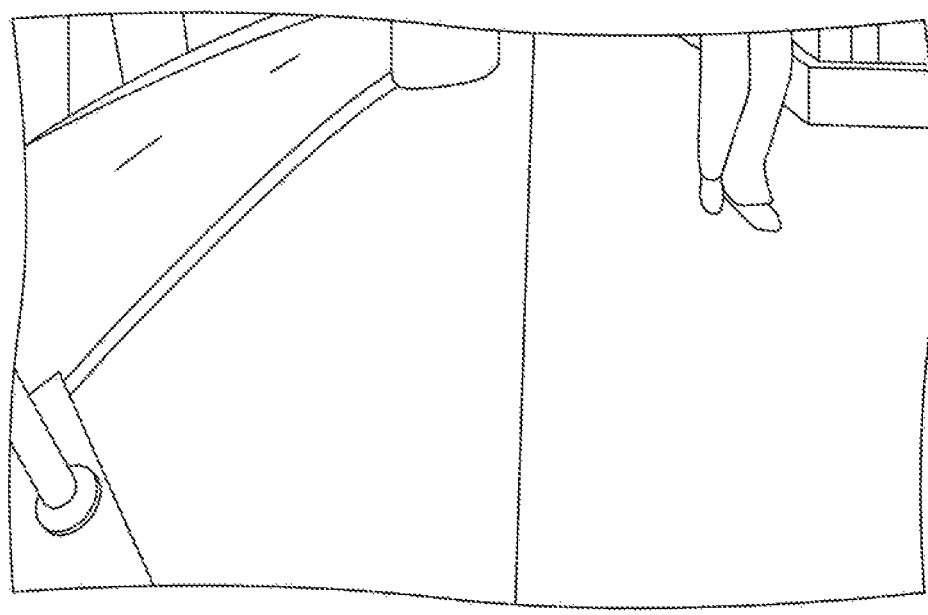
FIG. 11 depicts an image of a sidewalk as captured by an onboard camera sensor disposed on a PMV.

FIG. 11 depicts an image of a sidewalk as captured by an onboard camera sensor disposed on a PMV. The captured image is visual data collected from the PMV-mounted mobile camera during travel on a sidewalk surface and stored a file. The file size can range in size (e.g., 3 kB, 10 kB) depending on the resolution desired for the analysis. The electric scooter can be further equipped with a speedometer, GPS device, accelerometer, gyroscope, microphone, etc. The mobile device can transmit data wirelessly over a cellular network or WiFi network. Data collected by the sensors on the electric scooter, including an identifying code for the scooter, is transmitted to a cloud-based server.

In some embodiments, the camera and other sensors are under the control of a software package that is programmed to, for example, collect visual data (e.g., captured images) once every minute when the electric scooter's speed exceeded 4 mph. TABLE I summarizes the collection parameters for other sensors during the collection of visual data.

TABLE I

| Sensor Type | Data Collected | Collection Period | Collection Frequency |
| --- | --- | --- | --- |
| GPS | Speed; latitude; longitude; scalar; time | 10 s before image until 10 s after image | 10 Hz |
| Accelerometer | Accelerations (x-axis, y-axis, z-axis); time | 2.5 s before image until 2.5 s after image | 100 Hz |
| Gyroscope | Angular velocities (x-axis, y-axis, z-axis); time | 2.5 s before image until 2.5 s after image | 100 Hz |
| Microphone | Sound data | 2.5 s before image until 2.5 s after image | PCM 8-bit 8 kHz |

Visual Data of Triggering Events

Figure 12A:
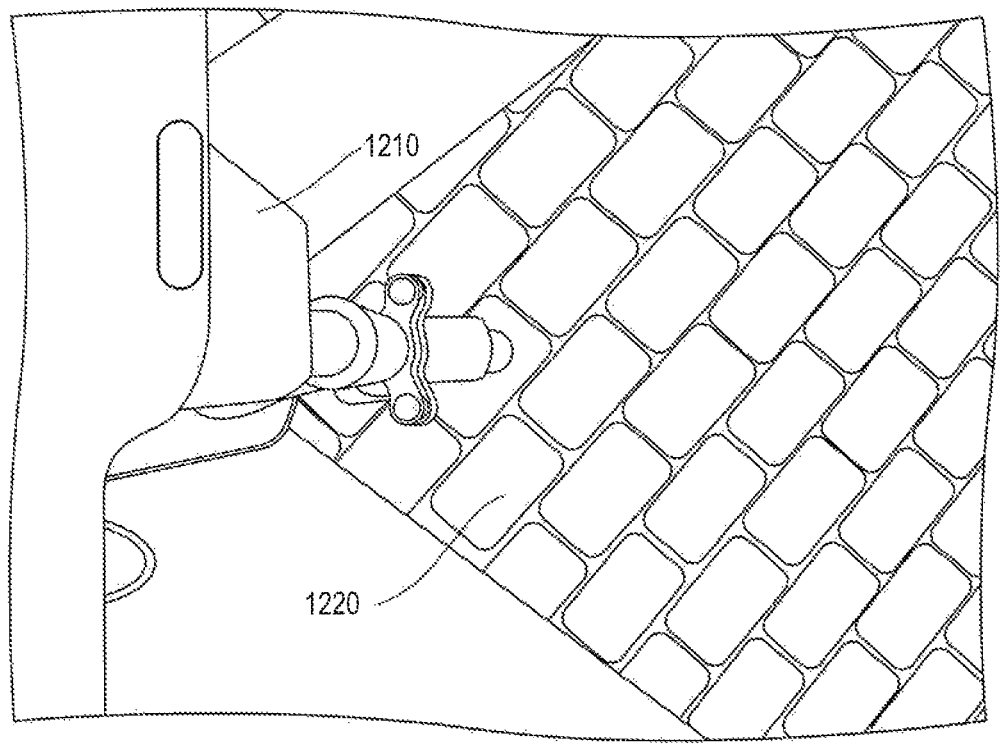
FIG. 12A depicts an image of a brick crosswalk as captured by a camera sensor disposed on an electric scooter.

In some embodiments, certain visual information may trigger the collection of data to determine if the travel surface is a sidewalk. FIG. 12A depicts an image captured by a camera mounted to an electric scooter 1210 as the scooter enters a brick crosswalk 1220. The visual data includes the appearance of the crosswalk 1220 and the orientation of the scooter 1210 relative to the brick pattern of the crosswalk

Figure 12B:
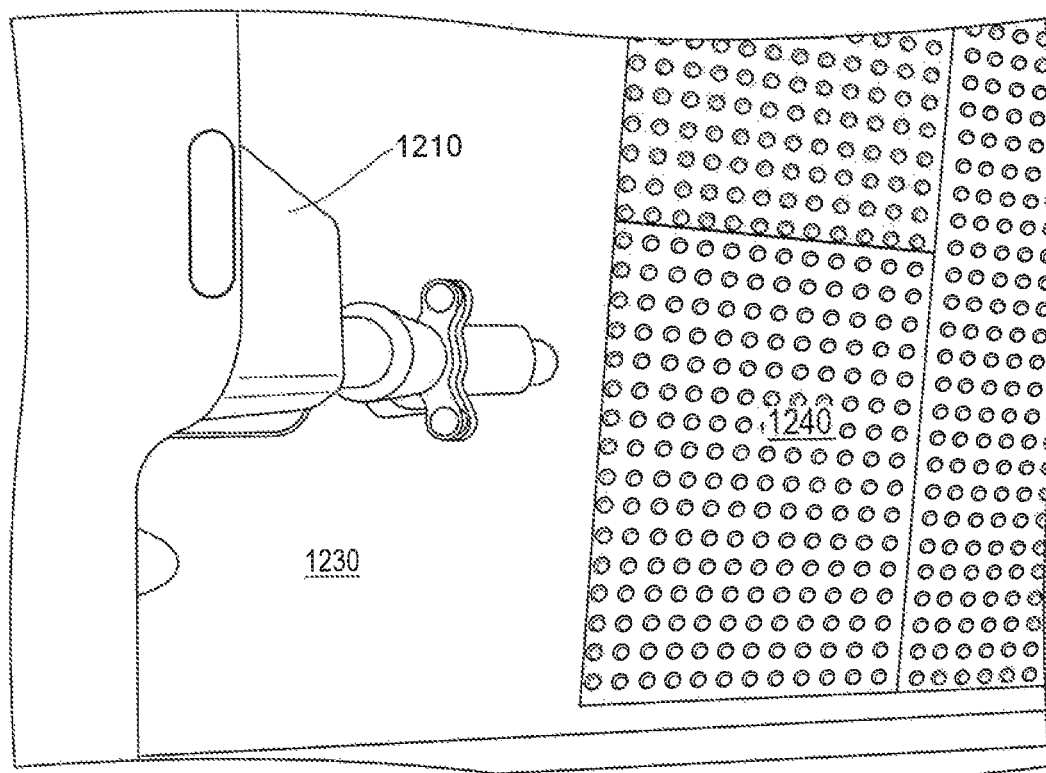
FIG. 12B depicts an image of a sidewalk ramp accessibility pad as captured by a camera sensor disposed on an electric scooter.

1220. The visual data may be utilized to train an ML algorithm used to determine whether the PMV user briefly crossed the crosswalk 1220 or traveled on the crosswalk 1220 from one sidewalk to another sidewalk. FIG. 12B depicts an image captured by the camera mounted to the electric scooter 1210 before the scooter travels across an accessibility pad 1240 at a sidewalk ramp 1230. In some embodiments, the visual data and associated vibration data or other sensor data obtained by PMV traveling across accessibility pads 1240 may be used identify a triggering event that signals the likelihood that a PMV entered or exited the sidewalk ramp 1230.

$$\begin{bmatrix} x \\ y \\ z \end{bmatrix} = \begin{bmatrix} 1 & 0 & 0 \\ 1 & \cos(\theta) & \sin(\theta) \\ 1 & -\sin(\theta) & \cos(\theta) \end{bmatrix} * \begin{bmatrix} x' \\ y' \\ z' \end{bmatrix}$$

$\theta$ may be about 12° in the above case.

In one example, the accelerometer measures speed acceleration data x, y, and z, and angular acceleration data Ax, Ay and Az at a frequency of about 100 Hz. Data is recorded and transmitted to a cloud-based server with a date and timestamp. Exemplary accelerometer data is shown in Table II below.

TABLE II

| Timestamp | x | y | Z | a-x | a-y | a-z |
|---|---|---|---|---|---|---|
| 20190308194435_044 | −0.070297 | −0.795753 | −0.167519 | 0.000931 | 0.006983 | −0.026072 |
| 20190308194435_055 | −0.072968 | −0.853024 | −0.177799 | 0.000582 | 0.011157 | −0.02692 |
| 20190308194435_064 | −0.067978 | −0.797264 | −0.167 | 0 | 0.011174 | −0.024908 |

Vibration Sampling Frequency Determination

Figure 13A:
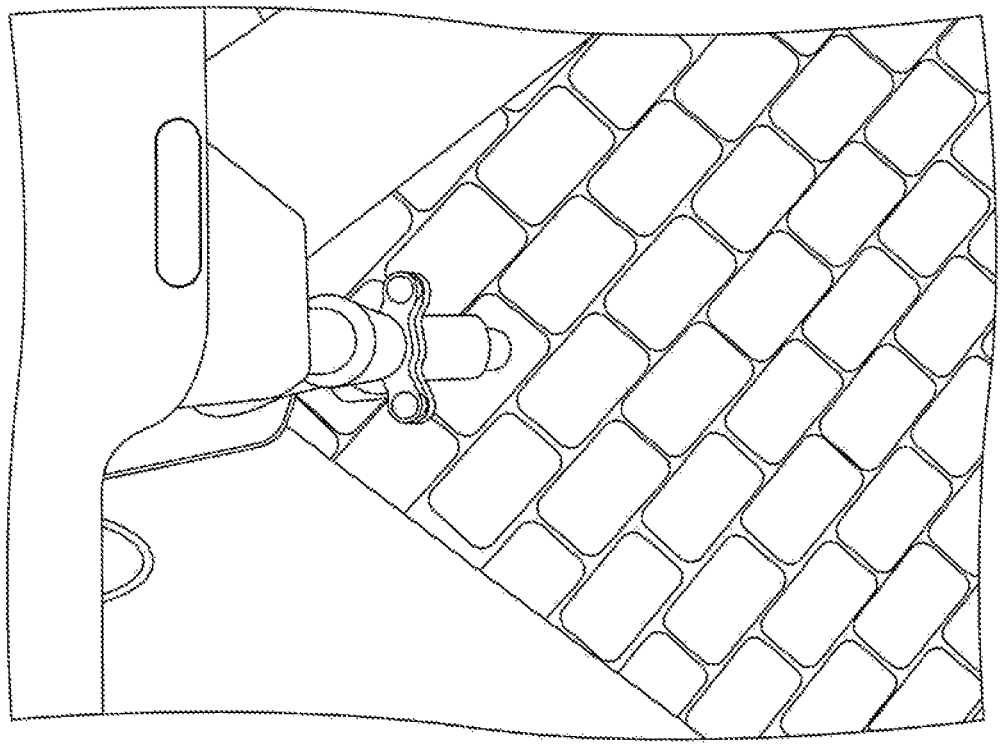
FIG. 13A depicts an image of a brick crosswalk as captured by a camera sensor disposed on an electric scooter.
Figure 13B:
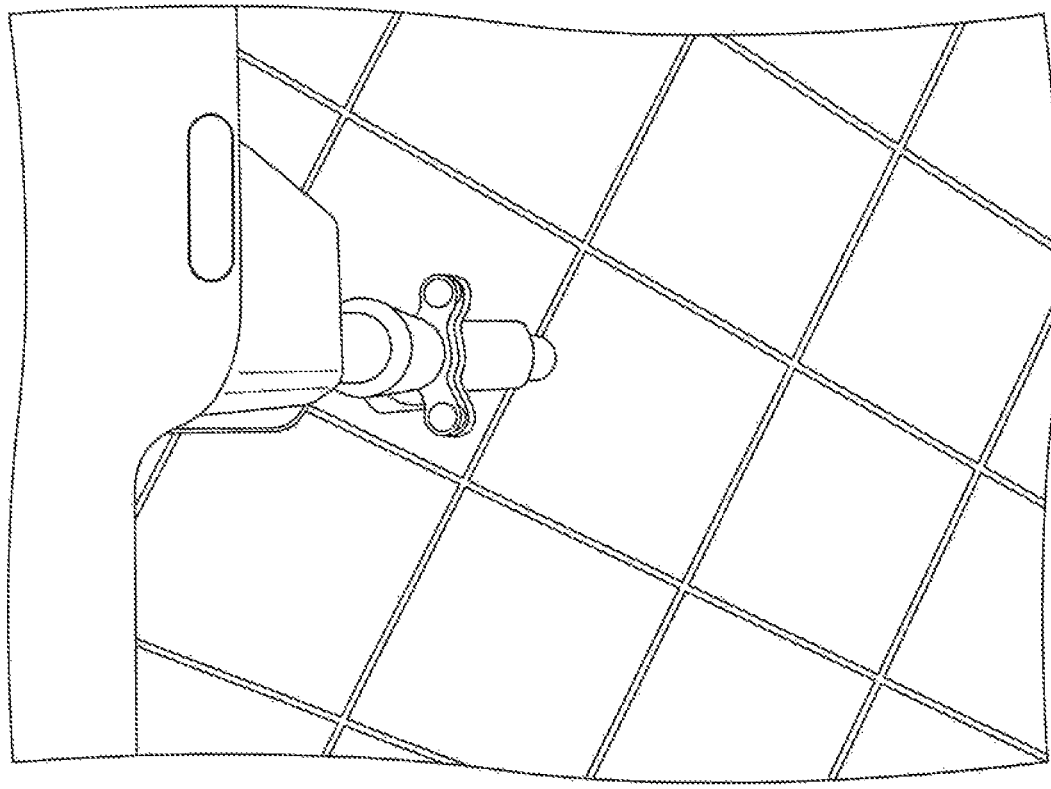
FIG. 13B depicts an image of a concrete brick sidewalk as captured by a camera sensor disposed on an electric scooter.

In some embodiments, vibration signals are optimized and sampled to identify frequencies that correspond to different surface types. FIG. 13A and FIG. 13B depict two common surface roughness patterns associated with PMV travel on sidewalks. Due to the scale of relatively small bricks or concrete blocks that compose the different sidewalk surfaces, a sensor may need to collect vibration data at a relatively high frequency to capture details associated with each surface's roughness.

For example, the sensitivity of vibration data collection at a maximum PMV travel speed of 20 mph could vary depending on the sampling frequency. At sampling frequencies of 10, 50, or 100 Hz, data collection could occur approximately every 0.9, 0.18, or 0.09 meters (m), respectively. At lower data sampling frequencies, the roughness pattern associated with the sidewalk would be largely missed, while higher frequency data collection captures information on a length scale comparable to the roughness pattern.

Vibration Data for Differing Travel Surfaces

Figure 14:
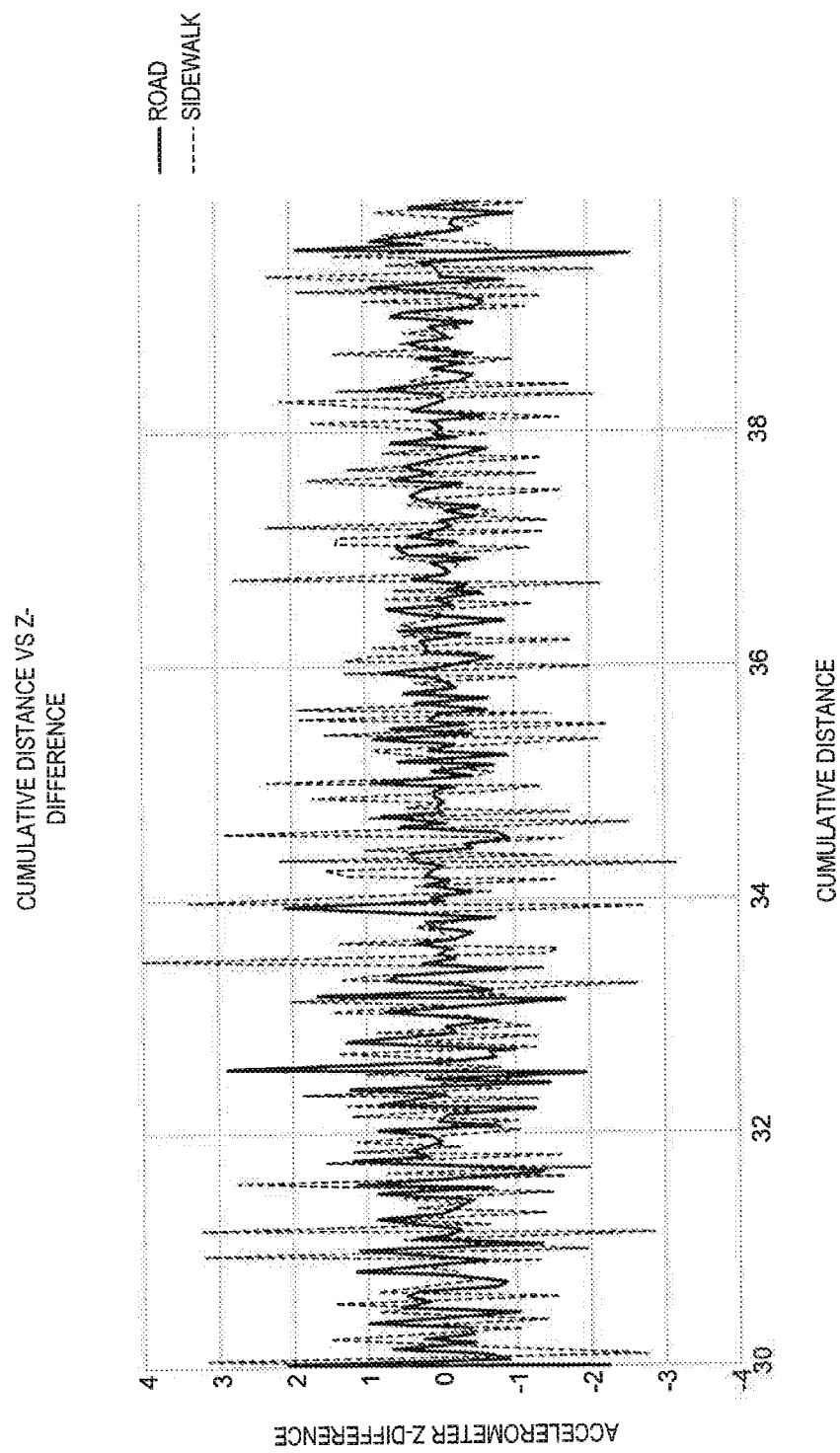
FIG. 14 plots accelerometer data obtained from an accelerometer disposed on an electric scooter traveling over asphalt and a concrete sidewalk.

In some embodiments, the vibrational data for different surface types is collected by using an accelerometer mounted to an electric scooter to train an ML model. For example, the scooter can travel over two different surface types: 1) asphalt road and 2) concrete sidewalk. FIG. 14 is a graph that shows superimposed vertical displacement data for travel over each surface type. The concrete sidewalk has a more consistent roughness pattern with larger vertical displacement. In contrast, the asphalt road generated a more random vertical displacement pattern with a smaller magnitude of displacement compared to the concrete sidewalk. The differences in surface characteristics (e.g., roughness patterns) between the concrete sidewalk and asphalt road could be used to train a ML algorithm to discern between these two types of travel surface based on vibration data.

Sample Accelerometer Data

Figure 15:
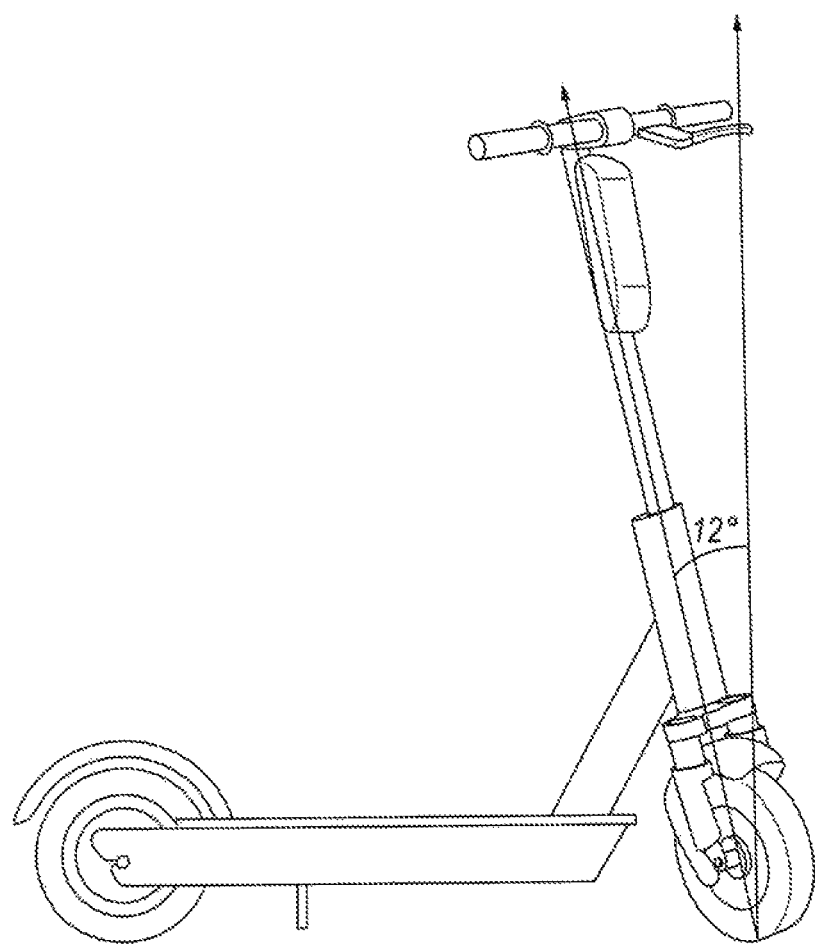
FIG. 15 depicts an image of an electric scooter with an accelerometer mounting angle that deviates from true vertical.
Figure 16:
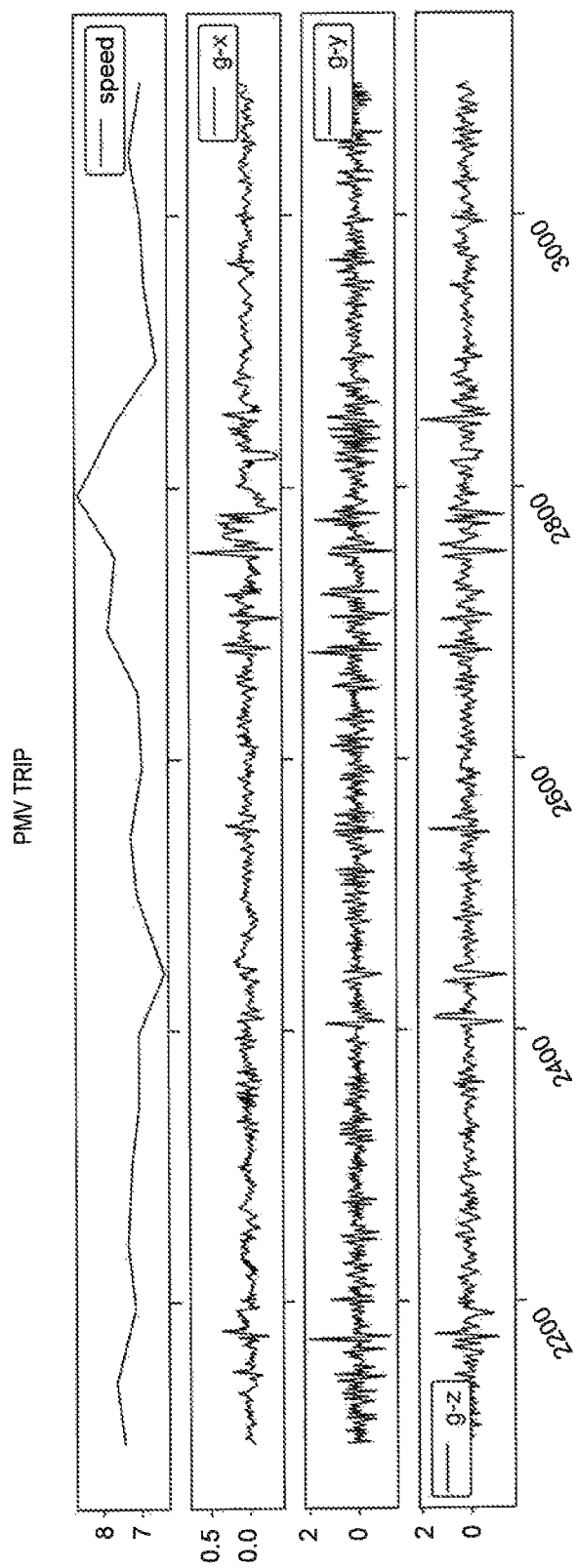
FIG. 16 depicts speedometer and accelerometer data for a PMV traveling on a concrete sidewalk.

An accelerometer is mounted on the electric scooter. The accelerometer is mounted parallel to the axis of the steering tube of the scooter. The axis can be inclined about 12° from vertical (or some other suitable or variable amount) as shown in FIG. 15. The accelerometer data is adjusted to account for the inclination from vertical by using the following transformation matrix:

In some embodiments, speedometer data is also measured at a selected sampling rate (e.g., about 2 Hz). The electric scooter including the accelerometer and speedometer can operate while data is recorded from the sensors. FIG. 16 displays a plot of accelerometer data (in X, Y and Z axes) and speedometer data as the PMV travels on a sidewalk.

Video Surface Type Determination

Figure 17A:
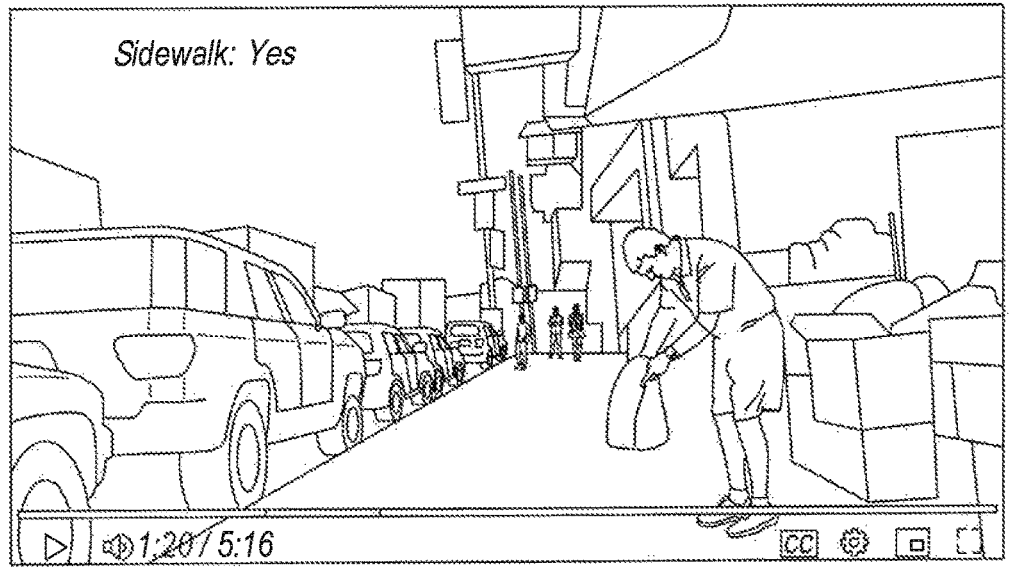
FIG. 17A depicts a single frame of video data analyzed by a ML algorithm based on a single block of data.

In some embodiments, a camera mounted to an electric scooter captures images during travel on a sidewalk. Visual data can be fed into two different versions of a recurrent neural network. The first recurrent neural network can predict the travel surface types based on travel through a single sidewalk block of length N. The second recurrent neural network uses data gathered from a trip through multiple blocks of length N to improve the accuracy of its prediction. For example, FIG. 17A depicts an image exported from the first recurrent neural network in which the computer determined that the surface is a sidewalk at a confidence value.

Figure 17B:
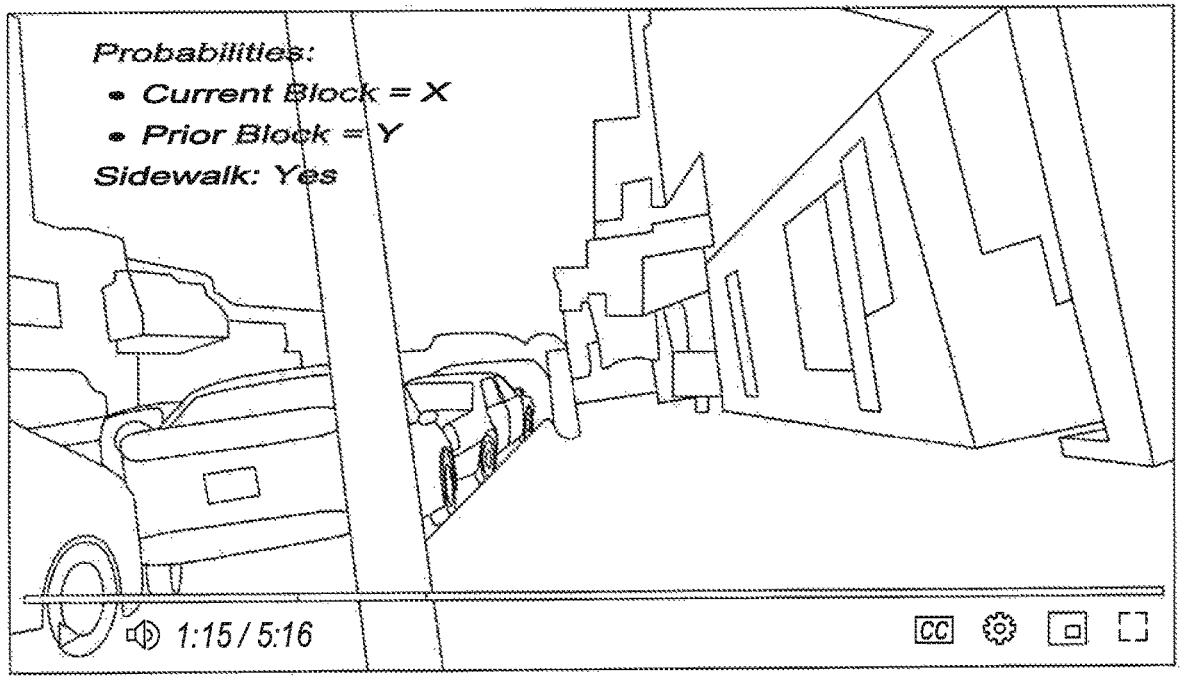
FIG. 17B depicts a single frame of video data analyzed by a ML algorithm based off of multiple blocks of data.

FIG. 17B depicts a single video frame of visual data that is analyzed by the second recurrent neural network. As shown, the recurrent neural network determined that a travel surface in the video frame is a sidewalk. The determination may be associated with a confidence value. In some embodiments, the determination is based on the visual data from two, three, four, or more blocks of a travel pathway. Hence, the surface type can be detected based on probabilities that a current block and any number of prior blocks have relatively high probabilities of being sidewalks. In some embodiments, an average value of at least some of the probabilities for each of the blocks is compared to a threshold value. If the average value is greater than or equal to the threshold value and/or the variance is less than or equal to another threshold value, the travel pathway can be identified as a sidewalk.

The disclosed technology can implement real-time or post-trip processing of sensor data. Moreover, a machine-learning (ML) model or other algorithm can ingest and/or process sensor data in bulk or in smaller segments (e.g., every 2 second). The manner in which sensor data is ingested and/or processed impacts how the ML model can utilize the sensor data. For example, when ingesting smaller segments, the embodiments can process the sensor data in near-real time and concurrently perform actions that control the PMV during the trip (e.g. slow the PMV down, send the user messages). In contrast, ingesting sensor data in bulk could improve the accuracy of an analysis due to the volume of data but could limit the ability to concurrently control the PMV.

Thus, ingesting or processing different volumes of data over different time periods could enable different use cases. For example, the ML model could process smaller volumes of data locally at the PMV or process larger volumes at a remote server of a cloud system. Moreover, this difference could impact how data is collected and sent over a network (e.g., periodically or post-trip bulk upload). In some embodiments, a combination of incremental and bulk processing is utilized. For example, in addition to incremental processing, a remote server could analyze millions of trips by different riders to determine a percentage of trips that involved sidewalk riding and locations of the sidewalk riding.

Figure 21:
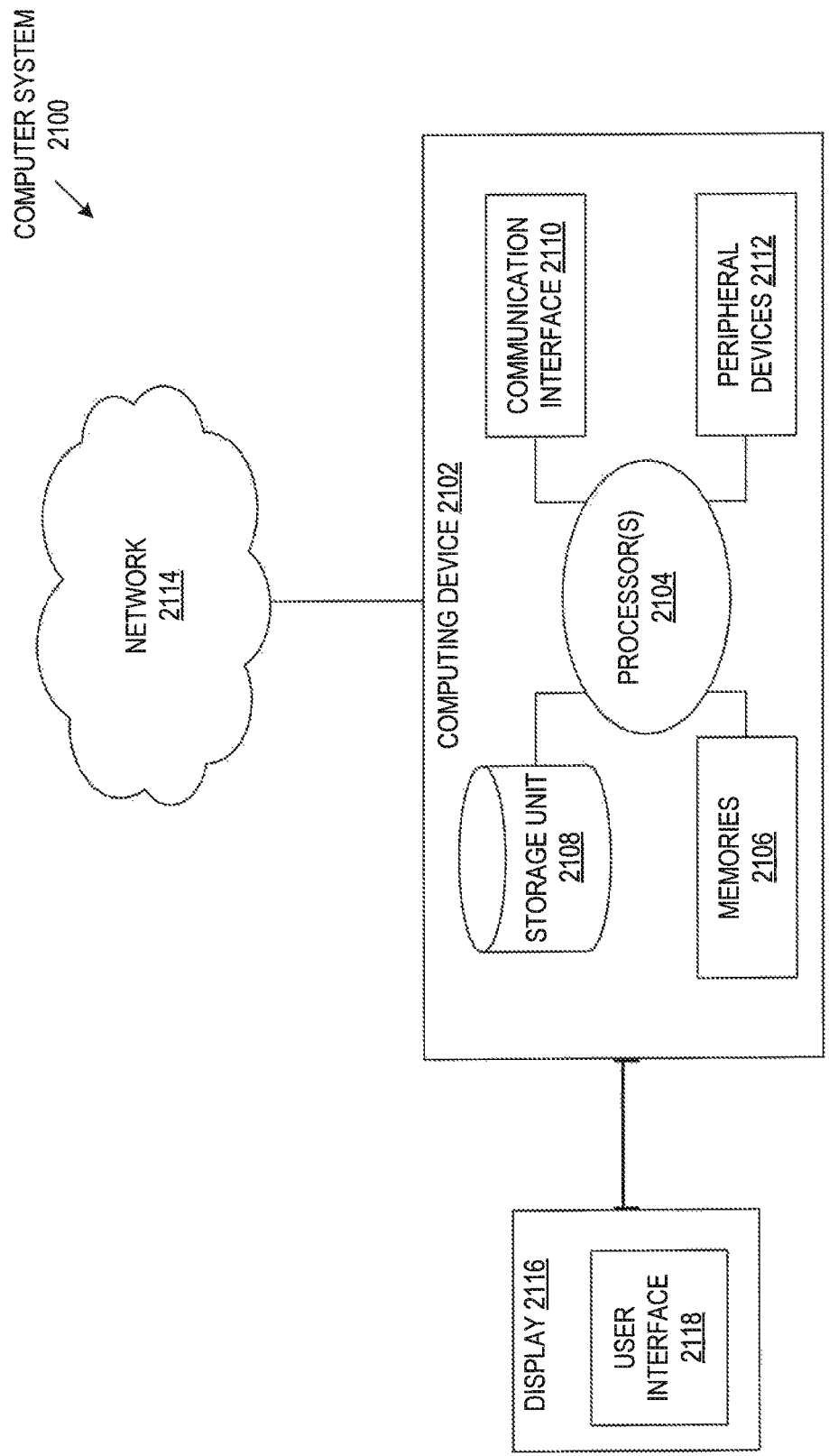
FIG. 21 is a block diagram illustrating an example computing system in which aspects of the disclosed technology can be embodied

FIG. 21 is a block diagram illustrating an example computer system 2100 in which aspects of the disclosed technology can be embodied. For example, the computer system 2100 can obtain sensor data, apply a learning algorithm to determine or predict surface types of travel corridors based on the sensor data, and/or apply optimization algorithms to improve the accuracy of the determination or prediction. The computer system 2100 can include a computing device 2102 such as a handheld mobile electronic device or a server computer that is located remotely from the handheld mobile electronic device.

The computer system 2100 includes one or more processor(s) 2104 (e.g., central processing unit (CPU)), which can be a single-core or multi-core processor or represent multiple processors for parallel processing. The computer system 2100 also includes one or more memories 2106 (e.g., random-access memory (RAM), read-only memory (ROM), flash memory), electronic storage unit 2108 (e.g., hard disk), communication interface 2110 (e.g., network adapter) for communicating with one or more other systems, and peripheral devices 2112, such as cache, other memory, data storage and/or electronic display adapters. The memories 2106, storage unit 2108, interface 2120 and peripheral devices 2112 are in communication with the processor(s) 2104 through a communication bus (solid lines), such as a motherboard. The storage unit 2108 can be a data storage unit or data repository for storing data. The computing device 2102 can be operatively coupled to a network 2114 with the aid of the communication interface 2110.

Examples of the network 2114 include the Internet, an internet and/or extranet, or an intranet and/or extranet communicatively coupled to the Internet. Other examples of the network 2114 include a telecommunication and/or data network. The network 2114 can include one or more computer servers, which can enable distributed computing, such as cloud-computing. For example, computer server(s) can enable cloud computing over the network 2114 to perform aspects of analysis, calculation, and generation as described herein. Such cloud computing may be provided by platforms such as AMAZON WEB SERVICES (AWS), MICROSOFT AZURE, GOOGLE CLOUD PLATFORM, AND IBM CLOUD. The network 2114, in some cases with the aid of the computing device 2102, can implement a peer-to-peer network, which may enable devices coupled to the computing device 2102 to behave as a client or a server.

The processor(s) 2104 can execute a sequence of machine-readable instructions, which can be embodied in a program or software. The instructions may be stored in a memory location, such as the memories 2106. The instructions can be directed to the processor(s) 2104, which can subsequently program or otherwise configure the processor(s) 2104 to implement methods of the present disclosure. Examples of operations performed by the processor(s) 2104 can include fetch, decode, execute, and writeback. The processor(s) 2104 can be part of a circuit, such as an integrated circuit. One or more other components of the system 901 can be included in the circuit. In some cases, the circuit is an application specific integrated circuit (ASIC).

The storage unit 2108 can store files (e.g., drivers, libraries and saved programs) and/or user data (e.g., user preferences and user programs). In some embodiments, the computing device 2102 is coupled to one or more additional data storage units that are external to the computing device 2102, such as being located on a remote server that is communicatively coupled to the computing device 2102 over the network 2114.

The computing device 2102 can communicate with one or more remote computer systems through the network 2114. For instance, the computer system 2100 can communicate with a remote computer system of a user. Examples of remote computer systems include personal computers (e.g., portable PC), slate or tablet computers (e.g., APPLE IPAD, SAMSUNG GALAXY TAB), telephones, Smart phones (e.g., APPLE IPHONE, ANDROID-enabled device, BLACKBERRY), or personal digital assistants. For example, the user can access the computing device 2102 via the network 2114.

The disclosed methods can be implemented by way of machine (e.g., computer processor) executable code stored on an electronic storage location of the computer system 2100, such as, for example, on the memories 2106 or electronic storage unit 2108. The machine executable or machine-readable code can be provided in the form of software. During use, the code can be executed by the processor(s) 2104. In some cases, the code can be retrieved from the storage unit 2108 and stored on the memories 2106 for ready access by the processor(s) 2104. In some situations, the electronic storage unit 2108 can be excluded, and machine-executable instructions are stored on memories 2106. In some embodiments, the code is pre-compiled for use with a machine having a processor adapted to execute the code or can be compiled during runtime. The code can be supplied in a programming language that is selected to enable execution in a pre-compiled or as-compiled fashion.

Aspects of the computer system 2100, can be embodied in a programming framework. Aspects of the technology can constitute "products" or "articles of manufacture typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk.

Storage-type media can include the tangible memory of computers, processors or the like, or associated modules thereof, such as various semiconductor memories, tape drives, disk drives and the like, which may provide non-transitory storage at any time for the software programming. All or portions of the software may at times be communicated over the Internet or various other communications networks. Such communications, for example, may enable loading of the software from one computer or processor into another, for example, from a management server or host computer into a computer platform of an application server. Thus, another type of media that may bear the software elements includes optical, electrical and electromagnetic waves, such as used across physical interfaces between local devices, through wired or optical landline networks and over various air-links. The physical elements that carry such waves, such as wired or wireless links, optical links or the like, also may be considered as media bearing the software. As used herein, unless restricted to non-transitory, tangible storage media, terms such as a computer or machine "readable storage medium" may refer to any medium that participates in providing instructions to a processor for execution.

Hence, a machine-readable storage medium, such as computer-executable code, may take many forms, including but not limited to, a tangible storage medium, a carrier wave medium or physical transmission medium. Examples of non-volatile storage media include optical or magnetic disks, such as any of the storage devices in any computer(s) or the like, such as may be used to implement the databases shown in the drawings. Examples of volatile storage media include dynamic memory, such as main memory of a computer platform. Examples of tangible transmission media include coaxial cables, copper wire and fiber optics, including the wires that comprise a bus within a computer system. Examples of carrier-wave transmission media may take the form of electric or electromagnetic signals, or acoustic or light waves such as those generated during radio frequency (RF) and infrared (IR) data communications.

Common forms of computer-readable media therefore include, for example, a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 2100 can include or be in communication with an electronic display 2116 that comprises a user interface (UI) 2118. Examples of UIs include, without limitation, a graphical user interface (GUI) or web-based user interface. For example, the computer system 2100 can include a web-based dashboard (e.g., a GUI) configured to display, for example, a data to a user.

In some embodiments, at least some aspects of the disclosed technology can be implemented by way of one or more algorithms. An algorithm can be implemented by way of software upon execution by the processor(s) 2104. The algorithm can, for example, obtain sensor data, apply a trained algorithm to the sensor data to determine or predict surface types of travel corridors, or apply optimization algorithms to improve the accuracy of a determination or prediction.

While numerous embodiments have been shown and described herein, it will be obvious to those skilled in the art that such embodiments are provided by way of example only. It is not intended that the description be limited by the specific examples provided within the specification. While the embodiments have been described with reference to the aforementioned specification, the descriptions and illustrations of the embodiments herein are not meant to be construed in a limiting sense. Numerous variations, changes, and substitutions will now occur to those skilled in the art without departing from the disclosed embodiments. Furthermore, all aspects of the invention are not limited to the specific depictions, configurations or relative proportions set forth herein which depend upon a variety of conditions and variables. It should be understood that various alternatives to the embodiments described herein may be employed in practicing the invention. It is therefore contemplated that the embodiments shall also cover any such alternatives, modifications, variations or equivalents. It is intended that the following claims define the scope of the invention and that methods and structures within the scope of these claims and their equivalents be covered thereby.

We claim:

1. A method comprising:
   collecting surface type sensor data generated by a vehicle while traveling on a travel pathway, the surface type sensor data being indicative of a pattern of a travel pathway surface;
   wherein collecting the surface type sensor data comprises any of:
     collecting the surface type sensor data while the vehicle travels at a speed in a range between a low threshold and a high threshold;
     collecting the surface type sensor data over a designated travel distance of the vehicle; and
     collecting the surface type sensor data from a sensor at a frequency sufficient to detect a structural pattern of the travel path surface including periodic discontinuities;
   determining a surface type of a travel pathway the vehicle is traveling on by comparing the pattern of the travel pathway surface indicated from the collected surface type sensor data to a set of known patterns, each of the set of known patterns being indicative of the surface type of the travel pathway;
   wherein the comparing includes calculating a similarity measure between the pattern of the travel pathway surface indicated from the collected sensor data and each pattern of the set of known patterns, wherein the similarity measures at or above a threshold value are considered matches, and wherein a highest match is a determined type of travel pathway surface; and
   adjusting an operation of the vehicle based on the determined type of travel pathway.

2. The method of claim 1, wherein the vehicle is a personal mobility vehicle.

3. The method of claim 1, wherein the vehicle is an electric scooter and the travel pathway is a sidewalk.

4. The method of claim 1, wherein determining the surface type of travel pathway the vehicle is traveling on comprises:
   determining that the travel pathway is unsuitable for traveling by the vehicle.

5. The method of claim 1, wherein determining the surface type of travel pathway the vehicle is traveling on comprises:
   determining that the travel pathway is either a sidewalk or a road.

6. The method of claim 1, wherein determining the surface type of travel pathway the vehicle is traveling on comprises:
   determining that the travel pathway has a surface type that is unsuitable for traveling by the vehicle based on a surface type identified by the known pattern.

7. The method of claim 1, wherein adjusting the operation of the vehicle comprises:
   adjusting the operation of the vehicle to indicate an alarm visually or aurally.

8. The method of claim 1, wherein the sensor is disposed on the vehicle.

9. The method of claim 1 further comprising, prior to adjusting the operation of the vehicle:
obtaining location data about a plurality of travel pathways in a geographic region including the travel pathway, the plurality of travel pathways including at least some that are suitable for the vehicle.

10. The method of claim 1, wherein adjusting the operation of the vehicle includes performing an action selected from the group consisting of:
assisting a rider in navigating the vehicle by rendering a visual notification or an audible notification to suggest a route change to the rider;
adjusting a mobility operation of the vehicle by reducing a travel speed of the vehicle or stopping the vehicle;
activating an audible warning signal to notify pedestrians in a surrounding area of a presence of the vehicle;
rendering a message indicating a fine for violating an ordinance or a term of a user agreement; and
providing a reward or incentive to a rider of the vehicle.

11. The method of claim 1, wherein the surface type sensor data is indicative of a characteristic of a surface of the travel pathway on which the vehicle is traveling, has traveled, or is about to travel.

12. The method of claim 1, wherein the surface type sensor data is indicative of a characteristic of the travel pathway surface, the characteristic including at least one of a measure of roughness or a structural pattern of the surface.

13. The method of claim 1, wherein the set of known patterns are indicative of a street, a bike lane, a sidewalk, and a trail.

14. The method of claim 1 further comprising:
determining that the travel pathway is unsuitable for the vehicle by classifying the travel pathway based on whether an intended use of the type of travel pathway is for one of automobiles, personal mobility vehicles, and pedestrians.

15. The method of claim 1, wherein the surface type sensor data is generated by at least one of: an accelerometer configured to capture vibration data while the vehicle travels on a surface of the travel pathway, wherein the sensor data includes the vibration data, or a camera sensor configured to capture image data while the vehicle travels on the surface of the travel pathway, wherein the surface type sensor data includes the image data.

16. The method of claim 1, wherein the surface type sensor data is generated by a sensor selected from the group consisting of:
a gyroscope;
a compass;
a GPS sensor;
an inertial measurement unit (IMU);
a component of a radar system;
a component of a LIDAR system;
a microphone;
a voltmeter;
an amp meter;
a thermometer;
a pressure sensor;
an air flow meter;
a wheel speed sensor;
a light sensor;
a torque sensor;
a shock sensor;
a hygrometer;
a proximity sensor; and
an inclinometer.

17. The method of claim 1, wherein determining the surface type of travel pathway the vehicle is traveling on comprises:
processing the surface type sensor data with a computer model, the computer model being configured to distinguish among a plurality of different surface types of different travel pathways.

18. The method of claim 17, wherein the computer model comprises at least one of: a machine learning model that is trained based on a dataset of surface types indicative of a street, a bike lane, a sidewalk, and a trail; or a machine learning algorithm including a feed-forward neural network, a convolutional neural network, or a recurrent neural network.

19. The method of claim 1 further comprising:
generating a digital map of a geographic area based on the sensor data, the digital map including location data and a surface fingerprint for a surface of the travel pathway, and
adjusting another operation of another vehicle based on the digital map.

20. The method of claim 19, wherein the digital map comprises a plurality of surface fingerprints of a plurality of travel pathways and at least some of the plurality of surface fingerprints indicates roughness data as a function of a location on the digital map.

21. The method of claim 19, wherein the surface fingerprints indicate that the surface is composed of a combination of materials including any one or more of asphalt, concrete, gravel, crushed stone, chip rock, bricks, cobblestones, dirt, mud, sand, rubber, plastic, metal, wood, paint, grass, or mulch.

22. A non-transitory computer readable storage medium storing computer program instructions, the computer program instructions, when executed by a processor, cause the processor to:
collect surface type sensor data generated by a vehicle while traveling on a travel pathway, the sensor data being indicative of a pattern of a travel pathway surface;
wherein collecting the surface type sensor data comprises any of:
collecting the surface type sensor data while the vehicle travels at a speed in a range between a low threshold and a high threshold;
collecting the surface type sensor data over a designated travel distance of the vehicle; and
collecting the surface type sensor data from a sensor at a frequency sufficient to detect a structural pattern of the travel path surface including periodic discontinuities;
determining a surface type of the travel pathway the vehicle is traveling on by comparing the pattern of the travel pathway surface indicated from the collected surface type sensor data to a known pattern of a set of known patterns, each of the set of known patterns being indicative of the surface type of travel pathway;
wherein the comparing includes calculating a similarity measure between the pattern of the travel pathway surface indicated from the collected surface type sensor data and each pattern of the set of known patterns, wherein similarity measures at or above a threshold value are considered matches, and wherein a highest match is a determined type of travel pathway surface; and
adjust an operation of the vehicle based on the determined type of travel pathway surface.

23. A system comprising:
one or more memories that store instructions for processing sensor data to detect a surface type of a travel pathway for a vehicle; and
one or more processors where execution of the instructions by the one or more processors cause the system to:
collect the surface type sensor data generated by the vehicle while traveling on the travel pathway, the sensor data being indicative of a pattern of the travel pathway surface;
wherein collecting the surface type sensor data comprises any of:
collecting the surface type sensor data while the vehicle travels at a speed in a range between a low threshold and a high threshold;
collecting the surface type sensor data over a designated travel distance of the vehicle; and
collecting the surface type sensor data from one or more sensors at a frequency sufficient to detect a structural pattern of the travel path surface including periodic discontinuities;
determine a surface type of the travel pathway the vehicle is traveling on by comparing the pattern of the travel pathway surface indicated from the collected surface type sensor data to a set of known patterns, each of the set of known patterns being indicative of the surface type of travel pathway;
wherein the comparing includes calculating a similarity measure between the pattern of the travel pathway surface indicated from the collected surface type sensor data and each pattern of the set of known patterns, wherein similarity measures at or above a threshold value are considered matches, and wherein a highest match is a determined type of travel pathway surface, and
adjust an operation of the vehicle based on the determined type of travel pathway.

24. The system of claim 23 wherein:
the one or more sensors, the one or more memories, and the one or more processors are components of the vehicle.

25. The system of claim 23 wherein:
at least some of the one or more sensors, the one or more memories, and the one or more processors are components of a handheld mobile device mounted on the vehicle.

26. The system of claim 23 further comprising:
a network interface configured to communicate at least an indication of the surface type sensor data to a remote server and receive a command from the remote server to adjust the operation of the vehicle.

27. The system of claim 23 further comprising:
one or more light emitting devices configured to signal a plurality of states of the vehicle based on respective illumination patterns, wherein an illumination pattern includes a combination a color and an animation, and wherein a state corresponds to a charge state of a battery configured to power the vehicle.

* * * * *